(12) United States Patent
Ayres et al.

(10) Patent No.: US 11,988,854 B2
(45) Date of Patent: May 21, 2024

(54) WIDE FIELD-OF-VIEW HOLOGRAPHIC SKEW MIRRORS

(71) Applicant: Akonia Holographies LLC, Longmont, CO (US)

(72) Inventors: Mark R. Ayres, Longmont, CO (US); Adam Urness, Longmont, CO (US); Kenneth E. Anderson, Longmont, CO (US); Friso Schlottau, Lyons, CO (US)

(73) Assignee: Akonia Holographics LLC, Longmont, CO (US)

( * ) Notice: Subject to any disclaimer, the term of this patent is extended or adjusted under 35 U.S.C. 154(b) by 744 days.

(21) Appl. No.: 16/089,965

(22) PCT Filed: Mar. 1, 2017

(86) PCT No.: PCT/US2017/020087
§ 371 (c)(1),
(2) Date: Sep. 28, 2018

(87) PCT Pub. No.: WO2017/176389
PCT Pub. Date: Oct. 12, 2017

(65) Prior Publication Data
US 2019/0179063 A1 Jun. 13, 2019

Related U.S. Application Data

(63) Continuation-in-part of application No. PCT/US2016/048499, filed on Aug. 24, 2016, which
(Continued)

(51) Int. Cl.
*G02B 5/32* (2006.01)
*G02B 5/18* (2006.01)
(Continued)

(52) U.S. Cl.
CPC .............. *G02B 5/1861* (2013.01); *G02B 5/32* (2013.01); *G02B 26/0891* (2013.01);
(Continued)

(58) Field of Classification Search
CPC .............. G02B 5/1861; G02B 27/0172; G02B 26/0891; G02B 5/32; G02B 27/0081;
(Continued)

(56) References Cited

U.S. PATENT DOCUMENTS 4,930,847 A 6/1990 Cederquist
7,418,170 B2 8/2008 Mukawa et al.
(Continued)

FOREIGN PATENT DOCUMENTS

CN 1771454 A 5/2006
CN 1892271 A 1/2007
(Continued)

*Primary Examiner* — Balram T Parbadia
(74) *Attorney, Agent, or Firm* — Michael H. Lyons

(57) ABSTRACT

A holographic skew mirror has a reflective axis, or skew axis, that can be tilted with respect to its surface normal. Tilting the skew axis in two dimensions with respect to the surface normal expands the holographic skew mirror's possible field of view, e.g., to 60 or more. These additional angles can be accessed using an out-of-plane writing geometry with matched total internal grazing extension rotation (TIGER) prisms.

38 Claims, 20 Drawing Sheets

Related U.S. Application Data is a continuation-in-part of application No. 15/174,938, filed on Jun. 6, 2016, now Pat. No. 10,180,520.

(60) Provisional application No. 62/435,676, filed on Dec. 16, 2016, provisional application No. 62/407,994, filed on Oct. 13, 2016, provisional application No. 62/318,917, filed on Apr. 6, 2016, provisional application No. 62/209,290, filed on Aug. 24, 2015.

(51) Int. Cl.
*G02B 26/08* (2006.01)
*G02B 27/00* (2006.01)
*G02B 27/01* (2006.01)
*G03H 1/04* (2006.01)
*G03H 1/28* (2006.01)

(52) U.S. Cl.
CPC ..... *G02B 27/0081* (2013.01); *G02B 27/0172* (2013.01); *G03H 1/0404* (2013.01); *G03H 1/28* (2013.01); *G02B 2027/0123* (2013.01); *G02B 2027/0174* (2013.01); *G03H 2001/0439* (2013.01); *G03H 2001/0482* (2013.01); *G03H 2222/13* (2013.01); *G03H 2222/34* (2013.01); *G03H 2223/18* (2013.01); *G03H 2250/00* (2013.01); *G03H 2260/12* (2013.01)

(58) Field of Classification Search
CPC .... G02B 2027/0123; G02B 2027/0174; G03H 1/28; G03H 1/0404; G03H 2222/13; G03H 2001/0482; G03H 2222/34; G03H 2260/12; G03H 2250/00; G03H 2223/18; G03H 2001/0439
See application file for complete search history.

(56) References Cited

U.S. PATENT DOCUMENTS

| | | | |
|---|---|---|---|
| 7,502,168 | B2 | 3/2009 | Akutsu et al. |
| 7,764,413 | B2 | 7/2010 | Levola |
| 8,160,411 | B2 | 4/2012 | Levola et al. |
| 8,233,204 | B1 | 7/2012 | Robbins et al. |
| 8,446,675 | B1 | 5/2013 | Wang et al. |
| 8,665,178 | B1 | 3/2014 | Wang |
| 8,703,363 | B2 | 4/2014 | Takemori et al. |
| 8,903,207 | B1 | 12/2014 | Brown et al. |
| 9,075,184 | B2 | 7/2015 | Popovich et al. |
| 9,341,846 | B2 | 5/2016 | Popovich et al. |
| 9,456,744 | B2 | 10/2016 | Popovich et al. |
| 9,651,368 | B2 | 5/2017 | Abovitz et al. |
| 2003/0090753 | A1* | 5/2003 | Takeyama ............ G02B 17/026 359/15 |
| 2006/0182391 | A1 | 8/2006 | Cifelli et al. |
| 2006/0280095 | A1 | 12/2006 | Tsukagoshi et al. |
| 2008/0186547 | A1 | 8/2008 | Shimizu et al. |
| 2009/0028552 | A1 | 11/2009 | Chang et al. |
| 2009/0285528 | A1 | 11/2009 | Chang et al. |
| 2009/0303212 | A1 | 12/2009 | Akutsu et al. |
| 2013/0250430 | A1 | 9/2013 | Robbins et al. |
| 2014/0013158 | A1 | 1/2014 | Silverman et al. |
| 2014/0127611 | A1* | 5/2014 | Choi ...................... G03F 7/029 430/2 |
| 2014/0131586 | A1 | 5/2014 | Wang et al. |
| 2014/0140654 | A1 | 5/2014 | Brown et al. |
| 2015/0025594 | A1 | 1/2015 | Rohrer et al. |
| 2015/0255946 | A1 | 9/2015 | Kitamura |
| 2016/0154150 | A1 | 6/2016 | Simmonds et al. |
| 2017/0031160 | A1 | 2/2017 | Popovich et al. |
| 2017/0059759 | A1 | 3/2017 | Ayres et al. |
| 2017/0276940 | A1 | 9/2017 | Popovich et al. |
| 2019/0094981 | A1 | 3/2019 | Bradski et al. |

FOREIGN PATENT DOCUMENTS

| | | |
|---|---|---|
| CN | 101866141 A | 10/2010 |
| CN | 102928981 A | 2/2013 |
| CN | 103370659 A | 10/2013 |
| CN | 104777535 A | 7/2015 |
| JP | H11-265139 A | 9/1999 |
| JP | 2007-011057 A | 1/2007 |
| JP | 2009-300480 A | 12/2009 |
| KR | 1020060133881 A | 12/2006 |
| KR | 1020130006619 A | 1/2013 |
| WO | 2004023174 A2 | 3/2004 |
| WO | 2011/062036 A1 | 5/2011 |
| WO | 2017035283 A1 | 3/2017 |

\* cited by examiner

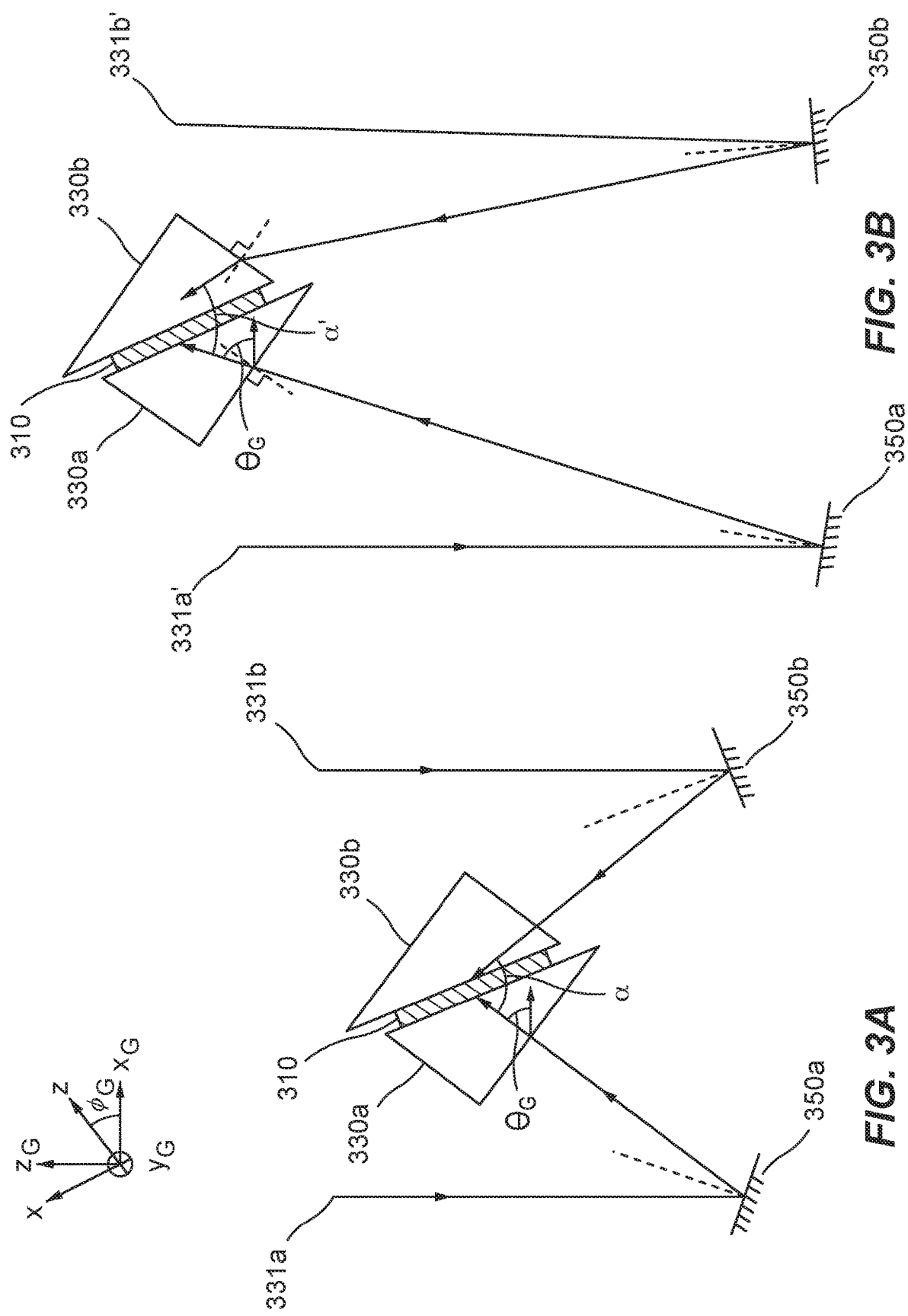

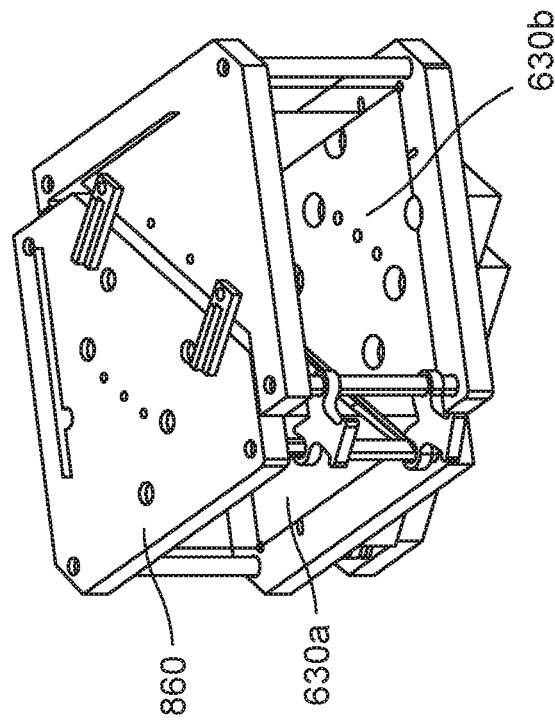
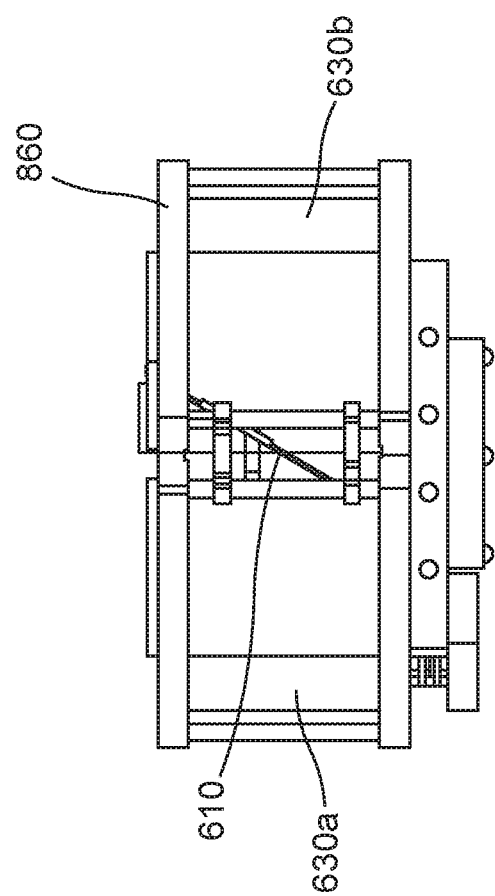
FIG. 8C
FIG. 8B

WIDE FIELD-OF-VIEW HOLOGRAPHIC SKEW MIRRORS

CROSS-REFERENCE TO RELATED APPLICATIONS

This application is a continuation-in-part of International Application No. PCT/US16/48499, filed Aug. 24, 2016, and entitled "Skew Mirrors, Methods of Use, and Methods of Manufacture," which is a continuation-in-part of U.S. application Ser. No. 15/174,938, filed Jun. 6, 2016, and entitled "Skew Mirrors, Methods of Use, and Methods of Manufacture," which in turn claims the priority benefit, under 35 U.S.C. § 119, of U.S. Application No. 62/318,917, filed Apr. 6, 2016, and entitled "Skew Mirrors, Methods of Use, and Methods of Manufacture," and of U.S. Application No. 62/209,290, filed Aug. 24, 2015, and entitled "Multiwavelength Diffraction Grating Mirrors, Methods of Use, and Methods of Manufacture." This application also claims the priority benefit, under 35 U.S.C. § 119, of U.S. Application No. 62/435,676, filed Dec. 16, 2016, and entitled "Wide Field of View Skew Mirror," and of U.S. Application No. 62/407,994, filed Oct. 13, 2016, and entitled "TIGER Prisms and Methods of Use." Each of these applications is incorporated by reference herein.

BACKGROUND

A holographic skew mirror is a holographic optical element that reflects incident light about a reflective axis that need not be perpendicular to the surface upon which the incident light impinges. In other words, a holographic skew mirror's reflective axis does not have to be parallel to or coincident with the surface normal of the holographic optical element. The angle between the reflective axis and the surface normal is referred to as the reflective axis angle and can be selected based on the desired application of the holographic skew mirror.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating or skew mirror is said to be structured to "reflect" incident light, a conventional artisan might prefer to say the grating structure is structured to "diffract" incident light, since grating structures are generally thought to act on light by diffraction. However, such use of the term "diffract" would result in expressions such as "incident light is diffracted about substantially constant reflective axes," which could be confusing.

Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

SUMMARY

Embodiments of the present technology include holographic optical elements, including but not limited to holographic skew mirrors, holographic input/output couplers, and other holographic optical reflective devices. One example is an optical reflective device that includes a grating structure residing in a grating medium. This grating structure is structured to principally reflect incident light as reflected light, where the incident and reflected light both include a first wavelength. The incident light of the first wavelength and the reflected light of the first wavelength form an angle bisected by a reflective axis, which varies by less than 1 degree where the incident light is incident upon the grating medium at a range of internal angles of incidence spanning at least 15 degrees. In addition, the reflective axis differs from a surface normal of the grating medium by at least 2.0 degrees.

In some implementations of this optical reflective device, the reflective axis varies by less than 1 degree where the incident light is incident upon the grating medium at a range of internal angles of incidence spanning at least 30 degrees. Likewise, the grating structure may include one or more holograms having a grating frequency ($|K_G|$) spanning a range of at least $2.00 \times 10^5$ radians per meter.

In some cases, the incident and reflected light both include a second wavelength that differs from the first wavelength by at least about 50 nm (e.g., the first wavelength may be 50 nm, 60 nm, 70 nm, 80 nm, 90 nm, 100 nm, or more greater than the second wavelength). And in some of these cases, the incident and reflected light includes a third wavelength that differs from each of the first wavelength and the second wavelength by at least about 50 nm (e.g., the first wavelength may be 50-100 nm greater than the second wavelength, which in turn may be 50-100 nm greater than the third wavelength). For example, the first wavelength may reside in the red region of the electromagnetic spectrum, the second wavelength may reside in the green region, and the third wavelength may reside in the blue region.

The grating structure in the optical reflective device may include one or more holograms having a grating frequency ($|K_G|$) spanning a range of at least $1.68 \times 10^6$ radians per meter, at least $5.01 \times 10^6$ radians per meter, or at least $1.24 \times 10^7$ radians per meter. For instance, the grating structure may include one or more holograms having grating frequencies ($|K_G|$) spanning a range of greater than $5.10 \times 10^5$ radians per meter and less than $3.15 \times 10^7$ radians per meter.

In some examples, the grating structure includes at least nine holograms. The mean adjacent $|\Delta K_G|$ of these holograms may reside in a range between $5.0 \times 10^3$ rad/m and $1.0 \times 10^7$ rad/m.

The optical reflective device may be configured or structured to act as an output coupler, with the incident light is incident upon the grating structure from inside the optical reflective device and the reflected light exiting the optical reflected device.

The optical reflective device may further comprise at least one substrate adjacent to the grating medium. For example, the optical reflective device may include two substrates with the grating medium disposed between the two substrates. In these cases, the grating medium may comprise a photopolymer medium at least 100 μm thick, and the two substrates may transmit at least 60% of the incident light and at least 60% of the reflected light. The refractive indices of the grating medium and the two substrates may be within about 0.1 of each other.

Other embodiments of the present technology include a method of using an optical reflective device. This method comprises illuminating a grating structure residing in a grating medium with incident light at a first wavelength. This incident light reflects off the grating structure to produce reflected light at the first wavelength. The incident and reflected light form an angle bisected by a reflective axis tilted by at least about 2.0 degrees with a surface normal of the grating medium. This reflective axis varies by less than 1 degree where the incident light is incident upon the grating structure within the grating medium at a range of internal angles of incidence spanning at least 15 degrees. In some cases, the reflective axis varies by less than 1 degree where the incident light is incident upon the grating medium at a range of internal angles of incidence spanning at least 30 degrees.

In examples of this method, illuminating the grating structure comprises coupling the incident light into the grating medium, e.g., via a holographic input coupler, prism, or edge coupling, and totally internally reflecting the incident light within the grating medium. Put differently, the grating medium may guide the incident light at least partway to the grating structure.

As mentioned above, the incident and reflected light may comprise a second wavelength different from the first wavelength by at least about 50 nm. The incident and reflected light may also comprise a third wavelength different from each of the first wavelength and the second wavelength by at least about 50 nm.

Examples of this method may also include coupling the reflected light out of the grating medium at an angle of about 25 degrees with respect to the surface normal of the grating medium. The grating medium may couple this reflected light towards a human eye in optical communication with the grating medium such that the reflected beam at least partially illuminates the human eye. In these cases, illuminating the grating structure may comprise illuminating the grating structure with an image such that a reflected image appears visible to the human eye.

Another example of the present technology includes a method of imaging. This method comprises disposing a grating medium containing a grating structure in optical communication with a human eye. This grating medium has a proximate surface defining a surface normal. A visible image is coupled into the grating medium and guided to the grating structure via at least one total internal reflection within the grating medium. The grating structure reflects the visible image about an axis of reflection forming an angle of at least about 2 degrees with respect to the surface normal. The visible image is coupled out of the grating medium via the proximate surface towards the human eye. This visible image spans a field of view in free space of at least about 30 degrees.

Yet another example of the present technology includes a method of writing holographic gratings in a photosensitive medium. This method includes disposing the photosensitive medium between an oblique face of a first prism and an oblique face of a second prism. A first beam is coupled into the photosensitive medium via a first surface of the photosensitive medium and the oblique face of the first prism. This first beam forms a first angle with respect to a surface normal of the first surface. A second beam is coupled into the photosensitive medium via a second surface of the photosensitive medium and the oblique face of the second prism. This second beam forms a second angle with respect to a surface normal of the second surface with a magnitude substantially equal to that of the first angle. In some case, this method also includes interfering a third beam and a fourth beam in the photosensitive medium to form a second holographic grating within the photosensitive medium.

Still another example of the present technology includes a device with a holographic optical element having at least one grating structured to reflect visible light over a field of view of at least about 50° in a first dimension. The field of view is measured outside the holographic optical element and is substantially centered on a surface normal of the holographic optical element. And the grating has a grating vector oriented at an angle of at least about 15° to about 45° with respect to the surface normal.

In some implementations, the holographic optical element includes a single grating structured to reflect visible light at wavelengths in a range from about 400 nm to about 700 nm over the field of view. In other implementations, the holographic optical element includes a plurality of gratings, each structured to reflect incident light at one wavelength of the visible light at a different angle within the field of view. In these implementations, the device may also include at least one light source, in optical communication with the holographic optical element, to illuminate the plurality of gratings with the visible light.

The field of view may be at least about 30° in a second dimension orthogonal to the first dimension. In addition, the angle formed by the axis of reflection and the surface normal may be about 20° to about 40°. And the holographic optical element may be substantially free of photo-initiators sensitive to visible light.

Another instance of the present technology includes a method of reflecting light. This method comprises illuminating at least one grating in a holographic optical element with visible light. The grating reflects at least a portion of the light over a field of view of at least about 50°. This field of view is centered on an axis of reflection that forms an angle of at least about 15° to about 45° with respect to a surface normal of the holographic optical element.

Still another instance of the present technology includes method of making a holographic optical element (and the resulting holographic optical element). This method comprises interfering a first beam and a second beam inside a holographic recording medium to form a first grating. The holographic recording medium has a planar surface. The first grating is structured to reflect incident light at a first visible wavelength over a field of view of at least about 50°. This field of view is centered on an axis of reflection that forms an angle of at least about 15° to about 45° with respect to a surface normal of the planar surface of the holographic optical element. In some cases, interfering the first beam and the second beam comprises coupling the first beam into the holographic recording medium via an oblique surface of a first prism and coupling the second beam into the holographic recording medium via an oblique surface of a second prism.

Yet another instance of the present technology includes device comprising a holographic optical element having a plurality of reflection gratings. Each reflection grating in the plurality of reflection gratings has a grating vector $K_G$ forming an angle of about 15° to about 45° with a surface normal of the holographic optical element and a grating frequency ($K_G S$) of at least $2.00 \times 10^5$ radians per meter.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A and 3B show an in-plane holographic recording system suitable for making holographic skew mirrors.

FIGS. 8A-8C shows a holographic recording system with TIGER prisms and the out-of-plane holographic recording geometry shown in FIGS. 7A-7C.

DETAILED DESCRIPTION

Holographic Skew Mirrors

Figure 1:
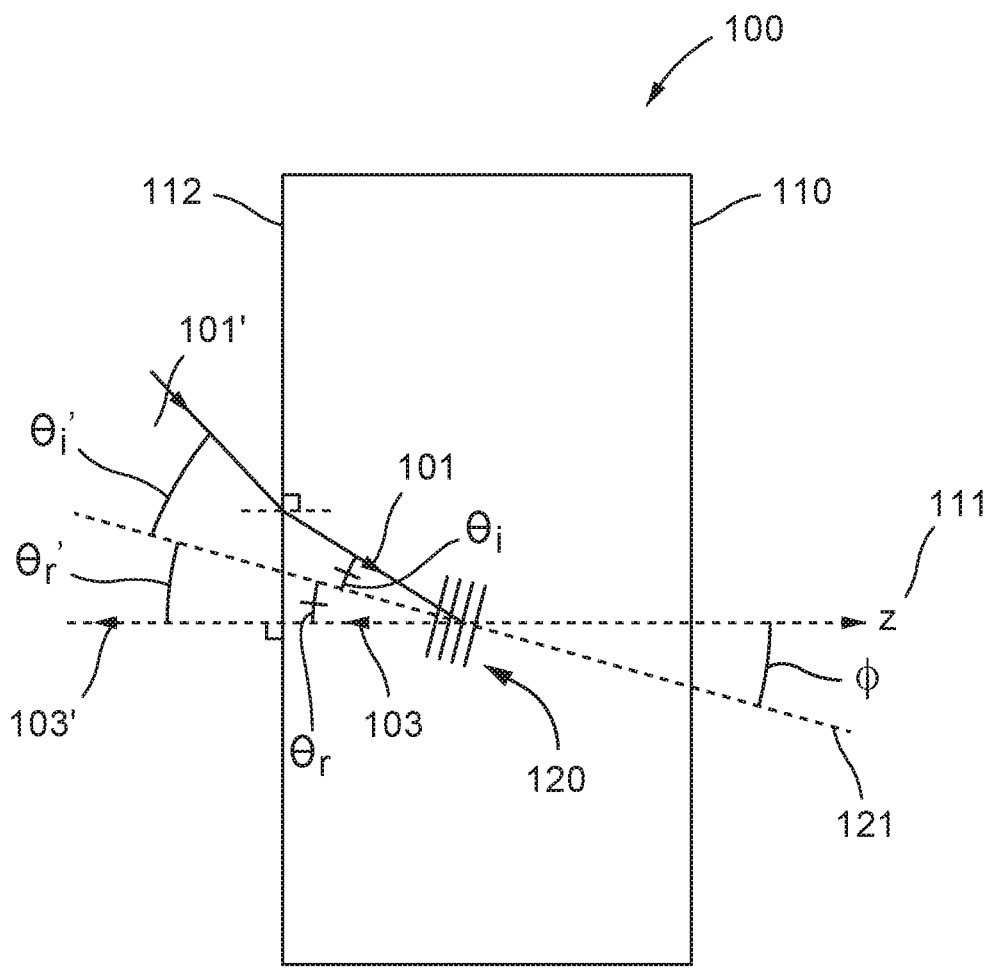
FIG. 1 shows a holographic skew mirror with a relatively narrow field of view.

FIG. 1 shows a real-space representation of a holographic skew mirror 100. This holographic skew mirror 100 includes a grating structure 120 recorded in a holographic grating medium 110, such as Tapestry® holographic photopolymer media from Akonia Holographics LLC of Longmont, Colo., or Bayfol® HX200 light-sensitive, self-developing photopolymer film from Covestro AG of Leverkusen, Germany. The grating structure 120 may comprise many discrete holographic gratings, each of which reflects light over a narrow range of angles and/or wavelengths.

In this case, the grating structure 120 includes many holographic gratings that define both a skew axis 121 and a reflective axis. The grating vector for each holographic grating is parallel to or coincident with the skew axis 121, which forms a skew angle θ with respect to a surface normal 111 of the holographic grating medium 110. As mentioned briefly above, each holographic grating reflects light at a particular wavelength or range of wavelengths over a particular range of internal angles of incidence, which are incidence angles on the grating structure 120 as measured within the holographic grating medium 110. The axis about which each holographic grating reflects incident light is called the reflective axis.

Each holographic grating's reflective axis may vary slightly from the skew axis 121 with wavelength, e.g., by about less than 0.1°, less than 0.01°, less than by 0.001°, etc. In light of this very slight variation, a skew axis/reflective axis may be called a skew axis when referring to making a skew mirror (for example when describing recording a hologram in a skew mirror grating medium), and as a reflective axis when referring to light reflective properties of a skew mirror.

A mean skew angle for a hologram (including a mean skew angle for a collection of holograms) can be substantially identical to a reflective axis angle, meaning the skew angle or mean skew angle is within 1.0°, 0.1°, 0.05°, 0.02°, 0.0167° (1 arcmin), or less of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. This variation occurs at the single hologram level and is inversely proportional to the hologram's thickness. Nevertheless, a skew angle determined based on recording beam angles can be within 1.0°, 0.1°, 0.05°, 0.02°, 0.0167°, or less of the reflective axis angle determined based on angles of incident light and its reflection, even where medium shrinkage and system imperfections contribute to errors in estimating skew angle and reflective axis angle.

In FIG. 1, an incident beam 101' of visible light impinges on a surface 112 of the holographic grating medium 110 at an angle $\theta_i'$ with respect to the skew axis 121. This beam 101' may be a monochromatic, polychromatic, or broadband visible beam of light. The holographic grating medium 110 has a higher refractive index than the surrounding air, so the incident beam 101' refracts at the surface 112 to form a refracted incident beam 101. The refracted incident beam 101 illuminates the volume hologram 120 at an angle $\theta_i$ with respect to the skew axis 121. The angle $\theta_i$ is also called the internal angle of incidence because it is the angle of incidence on the volume hologram 120 measured inside the holographic grating medium 110.

The volume hologram 120 reflects at least a portion of the refracted incident beam 101 at an angle $\theta_r$ with respect to the skew axis 121. The angle $\theta_r$ is also called the internal angle of reflection and is equal to the internal angle of incidence $\theta_i$ as shown in FIG. 1. Put differently, the skew axis 121 bisects an angle equal to twice the internal angle of incidence $\theta_i$.

The reflected portion of the refracted incident beam 101 is called the principal reflected beam 103. The principal reflected beam 103 impinges on the surface 112 of the holographic grating medium 110. It refracts at this boundary to form a refracted principal reflected beam 103' at an angle $\theta_r$' with respect to the skew axis 121. The holographic skew mirror's field-of-view, as measured in free space outside the holographic grating medium 110, is determined by the range of external angles of reflection $\theta_r$'.

k-Space Representation of a Holographic Skew Mirror

Figure 2B:
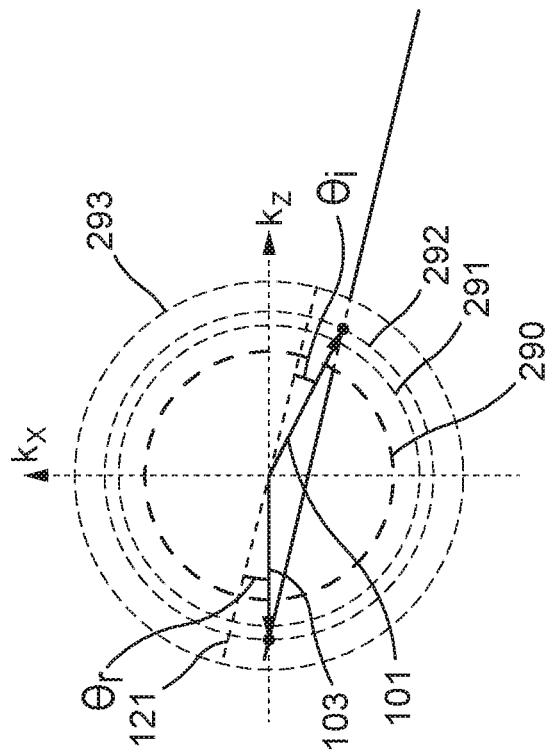
FIGS. 2A and 2B show a k-space representation of the holographic skew mirror shown in FIG. 1 without and with an incident beam, respectively.
Figure 2A:
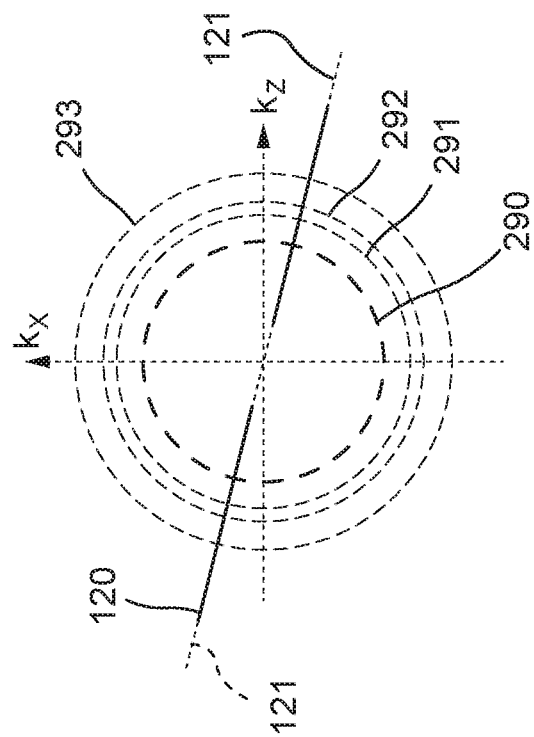

FIGS. 2A and 2B show a k-space representation of the holographic skew mirror 100 shown in FIG. 1 with and without the incident beam 101 and principal reflected beam 103, respectively. As readily appreciated by those of skill in the art, this k-space representation includes multiple concentric circles, each of which is a two-dimensional projection of a k-sphere representing the optical propagation vectors, or wave vectors, for light at a particular wavelength in the holographic medium. The length of the wave vector can be represented as:

$$k = \frac{2\pi n}{\lambda},$$

where n is the refractive index and $\lambda$ is the wavelength.

In normally dispersive media, including the holographic grating medium 110, the wave vectors (and hence the k-sphere radii) are longer for shorter wavelengths. Thus, the innermost circle 290 represents wave vectors for red light in the holographic grating medium 110, the second innermost circle 291 represents wave vectors for green light in the holographic grating medium 110, the second outermost circle 292 represents wave vectors for blue light in the holographic grating medium 110, and the outermost circle 293 represents wave vectors at the recording wavelength in the holographic grating medium 110.

FIGS. 2A and 2B also show the volume hologram 120, which appears in k-space as a line segment-like distribution whose distribution of grating vectors $K_G$ is parallel to the reflective/skew axis 121. FIG. 2B also shows the wave vectors of the incident refracted beam 101 and the principal reflected beam 103 with respect to the volume hologram's grating vector. In k-space, the wave vector of the principal reflected beam 103 is the vector sum of the volume hologram's grating vector and the wave vector of the incident refracted beam 101.

An In-Plane Holographic Skew Mirror Recording System

FIGS. 3A and 3B illustrate a skew mirror recording system 300 that uses in-plane recording prisms 330a and 330b (collectively, in-plane recording prisms 330) to couple light into a holographic recording medium 310, which is disposed between a pair of transparent substrates (not shown). The recording medium 310 and substrates are sandwiched between the in-plane recording prisms 330 so that a signal beam 331a and a reference beam 331b, also called recording beams 331, can be introduced into the holographic recording medium 310 at angles that would produce total internal reflection (TIR) at the substrate-air boundary were the in-plane recording prisms 330 not present. The in-plane recording prisms are typically index-matched to the substrates, and an index-matching fluid may be applied at a boundary between the prisms 330 and substrates (not shown) to reduce reflection and refraction at the prism/substrate boundaries. In practice, index-matching may mean that the refractive indices of the holographic recording medium 310, substrates, and prisms 330 are within about 0.1 or less.

Mirrors 350a and 350b (collectively, mirrors 350) reflect the recording beams 331a and 331b, respectively, into the holographic recording medium 310 via the prisms 330a and 330b, respectively. Each mirror 350a, 350b is oriented to direct the corresponding recording beam 331a, 331b such that it illuminates a base of the corresponding prism 330a, 330b. The recording beams 331 may refract at the air/base interface, then propagate into the holographic medium 310, where they interfere to produce a (reflection) grating recorded by the holographic recording medium 310. The holographic recording medium 310 and prisms 330 are translated back and forth along the $z_G$ axis with respect to the mirrors 350 using a translation stage (not shown) and the mirrors 350 are rotated to record the series of gratings that make up the skew mirror as shown in FIG. 3B.

FIGS. 3A and 3B also illustrate global, or recorder, coordinates ($x_G, y_G, z_G$) for the case of in-plane prisms. The origin of the global coordinates shown in FIGS. 3A and 3B is defined to be in the center of the output coupler in the center of the recording layer of the holographic recording medium 310. The Global Angle for recording, $\theta_G$, is defined as the angle of the recording beam 331a with respect to the $x_G$ axis within the holographic recording medium 310/prism 330a. Note that the nominal angle of the other recording beam 331b is 180°−$\theta_G$ (not marked), so that recorded grating vectors are aligned substantially with the $x_G$ axis. The angle between the recordings beams 331, or interbeam angle, within the holographic recording medium 310/prism 330a is marked as $\alpha$. The global skew angle is the angle between the $x_G$ and z axes and is marked as $\phi_G$.

Given the benefit of this disclosure, one skilled in the art will ascertain that standard coordinates (Cartesian coordinates in the frame of reference of the holographic recording medium 310) may be converted to global coordinates for the case of in-plane prisms by $$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix}. \quad (1)$$

Conversion from global to standard coordinates may also easily be derived.

In the global coordinate frame, the surface normal of the holographic recording medium 310 forms an angle $\phi_G$ (the global skew angle) with respect to the $z_G$ axis. In other words, the angle between the holographic recording medium 310 and the $z_G$ axis sets the skew axis of the holographic skew mirror. This skew axis can be changed, e.g., by rotating the holographic recording medium 310 and prisms 330 with respect to the recording beams 331 using an appropriate combination of stages and mounts.

For more information on holographic skew mirrors and methods of making and using holographic skew mirrors, see U.S. application Ser. No. 15/174,938, filed Jun. 6, 2016, and entitled "Skew Mirrors, Methods of Use, and Methods of Manufacture," which is incorporated herein by reference in its entirety.

Constraints on Field-of-View with In-Plane Recording

Unfortunately, in-plane recording systems generally cannot be used to make holographic skew mirrors with wide fields of view. This is due to constraints on the geometry and wavelengths of the beams used to record the volume holographic gratings for the holographic skew mirror. These constraints include the skew angle, the grating frequency, which determines the angle of reflection, and the difference between the recording beam wavelength, which is usually in the deep blue region of the electromagnetic spectrum (e.g., 400 nm to 430 nm), and the reading beam wavelength, which is usually in the visible region of the electromagnetic spectrum.

As mentioned briefly above, a holographic grating's grating frequency, which can be expressed as the magnitude of the grating wave vector, $|K_G|$, determines its angle of reflection: the smaller the grating frequency, the larger the angle of reflection. For a skew mirror, increasing the range of grating vector magnitudes in the grating structure is necessary to increase or widen the field of view. But the holographic recording medium's refractive index and the skew angle both limit the range of recording angles that can be accessed via in-plane prisms like those shown in FIGS. 3A and 3B. For certain combinations of skew angles and angles between the recording beams, one or both of the recording beams may become parallel to the holographic recording medium surface, making it difficult if not impossible to interfere the recording beams within the holographic recording medium.

To see how these geometrical constraints limit the holographic skew mirror's field of view, consider the in-plane recording system 300 shown in FIGS. 3A and 3B. As shown in FIG. 3B, one recording beam 331$b$' makes a grazing angle that is steeper (higher) with respect to surface of the recording medium 310 than that made by the other recording beam 331$a$'. Increasing this grazing angle reduces the spatial frequency (magnitude) of the holographic grating recorded by the holographic recording medium, which in turn increases the field of view of the skew mirror. Unfortunately, increasing the grazing angle may degrade the recording quality since it magnifies the effects of aberrations and refractive index mismatch between the prisms 330 and the holographic recording medium 310.

Furthermore, Snell's Law may limit the maximum grazing angle (the exact limit depends on the recording wavelength, the refractive indices of the recording medium and surrounding media, and the skew angle). Above this limit, the recording beam 331$b$' may reflect off the holographic recording medium 310 instead of coupling into it. The upper bound on the grazing angle may limit the ability to record lower frequency holograms, which may limit the skew mirror's field of view for some colors, particularly for large skew angles.

Figure 4B:
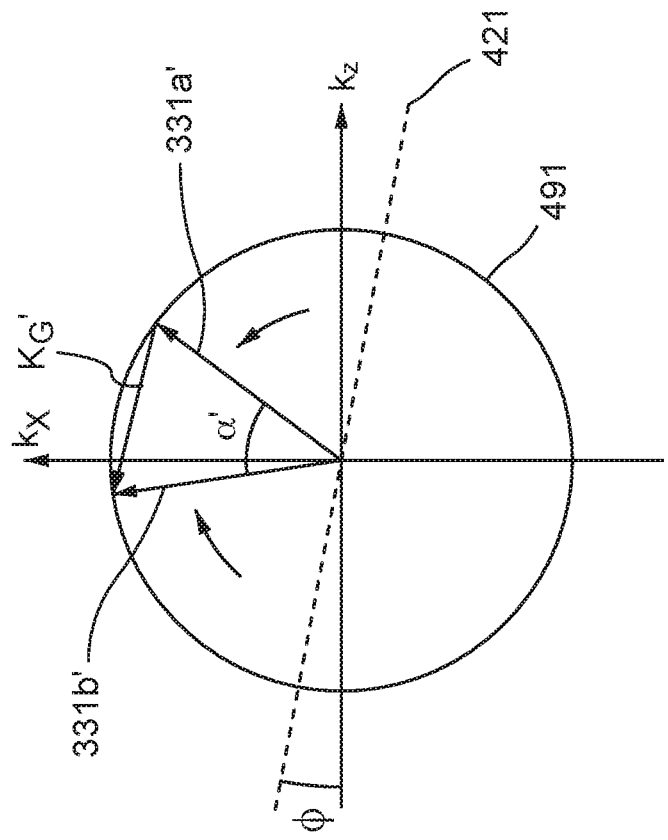
FIGS. 4A and 4B show k-space representations of making a holographic skew mirror using the in-plane holographic recording geometry of FIGS. 3A and 3B, respectively.
Figure 4A:
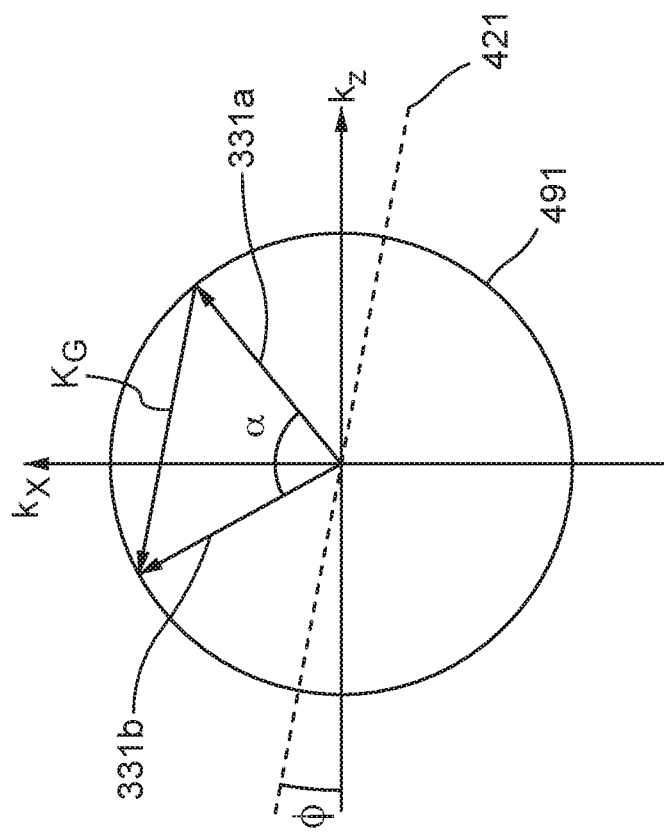

FIGS. 4A and 4B show k-space representations of the in-plane recording geometries in FIGS. 3A and 3B, respectively. In FIG. 4A, the recording beams 331$a$ and 331$b$ are incident on the holographic recording medium such that their wave vectors form an interbeam angle $\alpha$ and record a holographic grating with a grating vector $K_G$ that is parallel to the skew axis 421. In FIG. 4B, the recording beams 331$a$' and 331$b$' are incident on the holographic recording medium such that their wave vectors form an interbeam angle $\alpha$' and record a holographic grating with a grating vector $K_G$' that is also parallel to the skew axis 421.

The size of the grating vector determines the internal incidence angle(s) over which the corresponding holographic grating reflects incident light. Holographic gratings with smaller gratings reflect light at larger internal incidence angles as measured from the skew axis, and holographic gratings with larger gratings reflect light at smaller internal incidence angles as measured from the skew axis. The largest possible grating vector is recorded when the recording beams' wave vectors are antiparallel and aligned with the skew axis 421. The corresponding holographic grating retro-reflects light incident on the grating medium along the skew axis 421 ("normal incidence" for a holographic skew mirror).

As the angle between the recording beam 331$b$' and the x axis shrinks, the interbeam angle $\alpha$ also shrinks, reducing the size of the grating vector $K_G$ and increasing the possible field of view. Eventually, though, the angle between the recording beam 331$b$' and the x axis becomes so small that the recording beam 331$b$' becomes parallel to the surface of the holographic recording medium 310 instead of refracting into the holographic recording medium 310. In other words, the limit occurs when the grating vector of the recording beam 331$b$' is aligned with $k_x$, i.e., when the recording beam 331$b$' is parallel to the surface of the holographic recording medium 310. At this point, the recording beam 331$b$' no longer interferes with the other recording beam 331$a$' within the holographic recording medium 310 to record a reflection grating. This limits the smallest size of the grating vector and hence the field of view. Although rotating the skew axis may compensate for this effect, it also limits the range of permissible skew angle/field of view combinations.

In sum, FIGS. 3A, 3B, 4A, and 4B illustrate the tradeoff between permissible skew angle and permissible field of view in the in-plane recording geometry: generally, it is possible to have a large skew angle or a large field of view with in-plane recording, but not both.

The smallest accessible angular difference between recording beams depends in part on the wavelengths of the recording beams and the reading beams and dispersion of the holographic recording medium. Most holographic recording media is optimized to record gratings at deep blue wavelengths, e.g., 405 nm, and to be insensitive to visible light at longer wavelengths. But it is difficult to impossible to interfere deep blue beams within a holographic recording medium at angular differences small enough to generate reflective gratings at spatial frequencies low enough to produce a wide field-of-view at visible wavelengths in an in-plane recording system.

Increasing the recording beam wavelength would alleviate this problem, but would also require a holographic recording medium sensitive to longer-wavelength light. But increasing the holographic recording medium's sensitivity to longer-wavelength light would make the holographic recording medium more susceptible to incomplete bleaching at visible wavelengths. This is because holographic recording media with photo-initiators sensitive to visible light may polymerize when exposed to visible light and is therefore less suitable for making holographic optical elements that operate at visible wavelengths. Moreover, photo-initiators sensitive to visible light can cause undesirable visible light absorbance in the grating medium. This would make the holographic recording medium less suitable for use in a skew mirror that reflects light at visible wavelengths.

Out-of-Plane Recording for Making Wide Field-of-View Holographic Skew Mirrors

As explained above, geometry limits the range of accessible interbeam angles (and hence the maximum field of view) for writing holographic skew mirrors with in-plane recording systems. But the inventors have recognized that it is possible to access smaller interbeam angles by tilting the surface normal out of the plane accessed by an in-plane recording system. In other words, rotating the medium 90° about the skew axis relieves the constraints shown in FIGS. 3A, 3B, 4A and 4B.

Figure 5B:
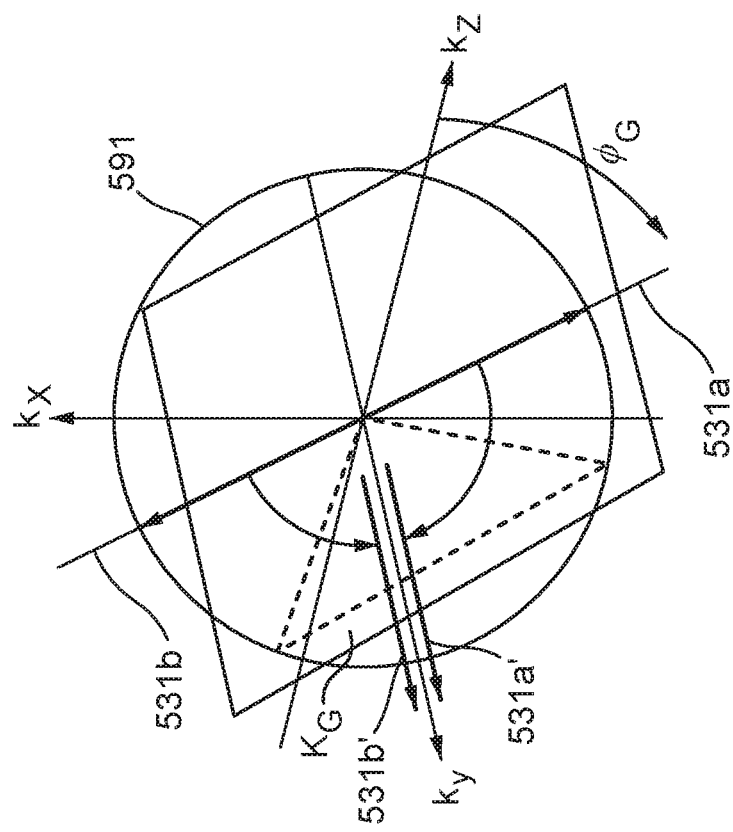
FIGS. 5B and 5D show k-space representations of the real-space views shown in FIGS. 5A and 5C, respectively.
Figure 5A:
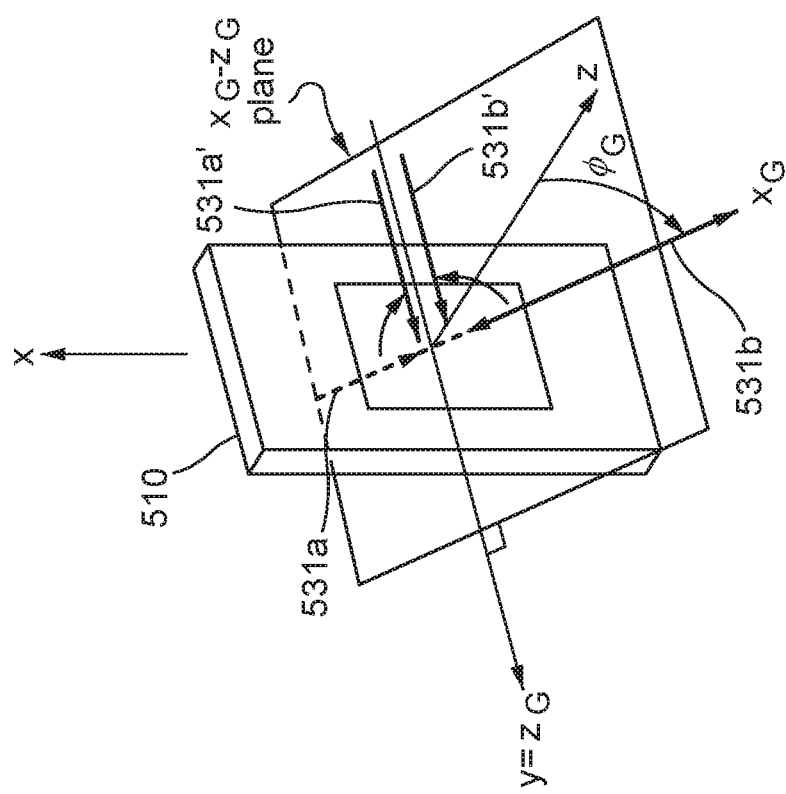
FIGS. 5A and 5C show real-space perspective views of an out-of-plane holographic skew mirror writing geometry.
Figure 5D:
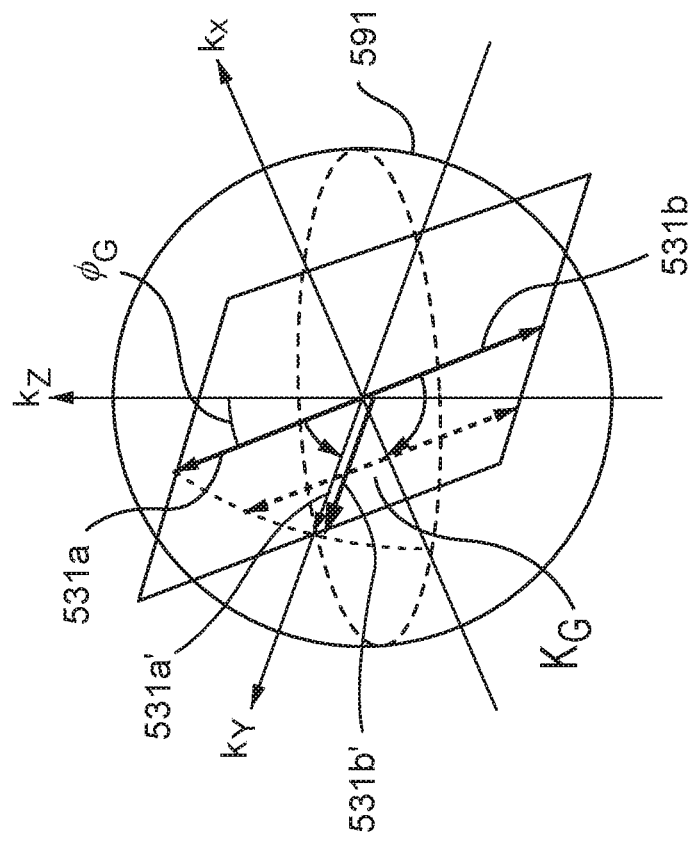
Figure 5C:
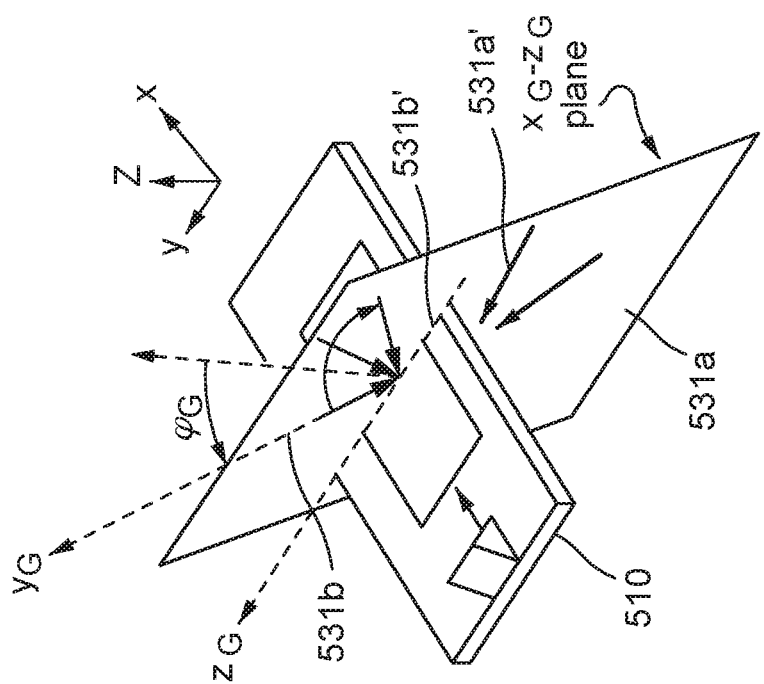

FIGS. 5A-5D show how rotating recording beams 531a and 531b (collectively, recording beams 531) about the $y_G$ axis, which is in the x-z plane of the holographic recording medium 310, makes it possible to record shorter holographic gratings than is possible with an in-plane recording geometry. FIGS. 5A and 5C show real-space views from different perspectives of the recording beams 531 incident on a holographic recording medium 510 that is tilted about the $z_G$ axis of the recording system's coordinate frame (i.e., they axis of the holographic recording medium 510). The recording beams 531 are rotated within the $x_G$-$z_G$ plane to record grating vectors that also lie in the $x_G$-$z_G$ plane.

FIGS. 5B and 5D are k-space representations of the real-space views shown in FIGS. 5A and 5C, respectively. As shown in both FIGS. 5B and 5D, the wave vectors of the recording beams 531 lie within the $x_G$-$z_G$ plane, which forms an off-axis slice of a k-sphere 591 representing the recording beams' momentum within the holographic recording medium 510. As in the in-plane recording geometry, changing the interbeam angle between the recording beams 531 changes the length of the grating vector. The longest grating vector (maximum $|K_G|$) is written when the recording beams 531 are counter-propagating along the $x_G$ axis. and the smallest grating vector (minimum $|K_G|$) occurs when the recording beams 531' are co-propagating along the $z_G$ axis (y axis). This is the grazing condition for both recording beams 531' as shown in FIG. 5A.

Those of skill in the art will appreciate that FIGS. 5A-5C show just one of the many possible orientations of recording beams and skew angles. The skew angle and each recording beam can be adjusted as desired, within the constraints imposed by the writing wavelength and the holographic recording medium's refractive index, to record holographic gratings at a wide variety of spatial frequencies. The exact number and spatial frequencies of holographic gratings depend on the desired field of view of the holographic skew mirror, among other things.

In-Plane Versus Out-of-Plane Recording

Figure 6:
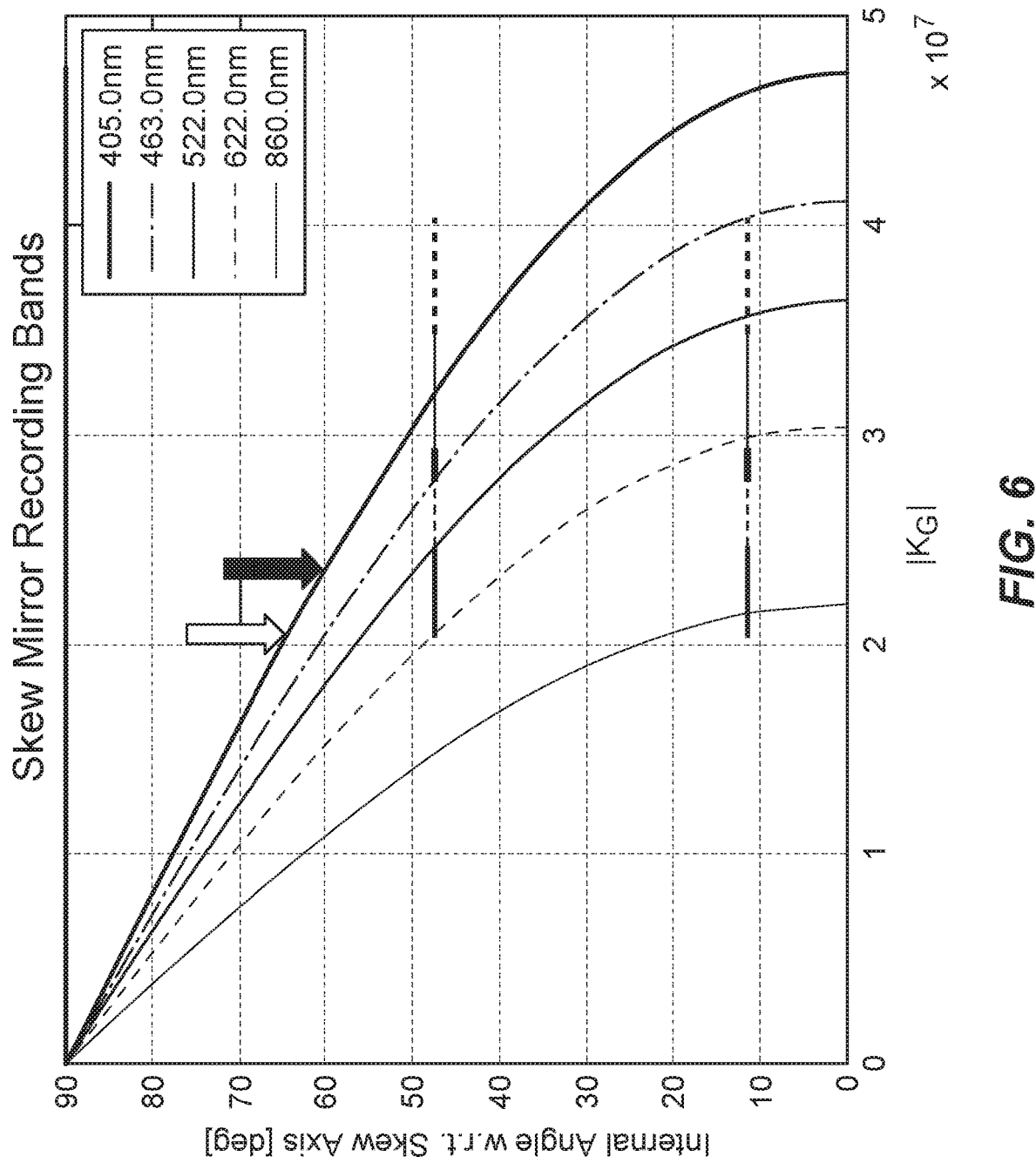
FIG. 6 is a plot that shows the angular recording bands achievable with both in-plane and out-of-plane holographic skew mirror recording geometries.

FIG. 6 is a plot illustrating the capabilities of out-of-plane vs. in-plane recording prisms for a specific recording geometry. The plot indicates the spatial grating frequencies for a waveguided, head-mounted display (HMD) skew mirror output coupler with skew axis $\phi=-30.25°$ supporting a horizontal field of view of 53.4°. The horizontal axis is grating frequency (in rad/m), and the vertical axis shows the Bragg-matching angle with respect to the grating vector/skew axis. The five curves illustrate the Bragg-matching angle for five different indicated wavelengths: curve 690 is for the wavelength at which the holograms are recorded (405 nm); curve 691 is for 463 nm (blue); 692 is for 522 nm (green); curve 693 is for 622 nm (red); and curve 694 is for 860 nm. The horizontal lines at 47.75° and 12.75° demark the range of spatial grating frequencies required for the red, green, and blue wavelengths, coded by color.

With in-plane recording prisms, the reference beam grazing condition occurs where the writing wavelength curve crosses 59.75° (=90°−$\phi$), as indicated by the solid arrow. This indicates that the in-plane recording system cannot record gratings that fall to the left of the solid arrow. Gratings close to the right side of the solid arrow may suffer degradation since the reference beam is incident on the index-matched boundary at a very shallow angle.

With out-of-plane recording, however, the grazing condition does not occur until the writing wavelength curve crosses 90° at the left edge of the plot. The lowest writing angle, indicated by the open arrow, makes angles of about 22° with respect to the internal boundaries for both the reference and signal beams, an angle which is easily practicable.

TIGER Prisms for Out-of-Plane Holographic Skew Mirror Recording Systems

Figure 7A:
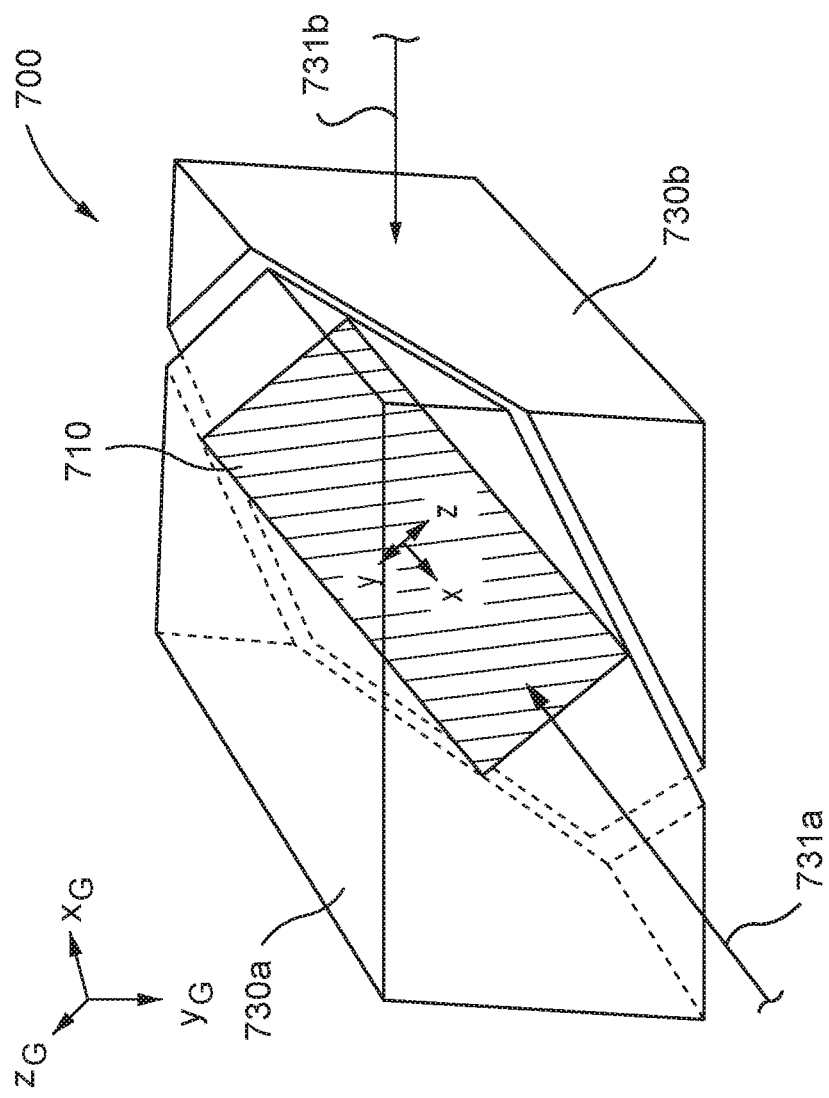
FIGS. 7A-7C show different views of a holographic recording medium sandwiched between Total Internal Grazing-Extension Rotation (TIGER) prisms for writing holographic skew mirrors with wide fields-of-view.
Figure 7B:
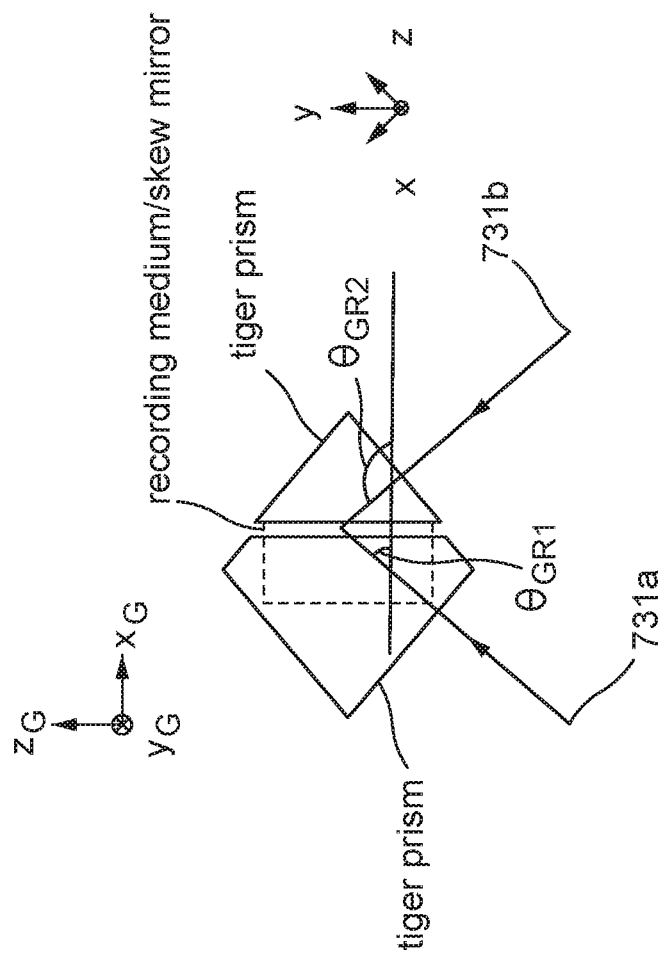
Figure 7C:
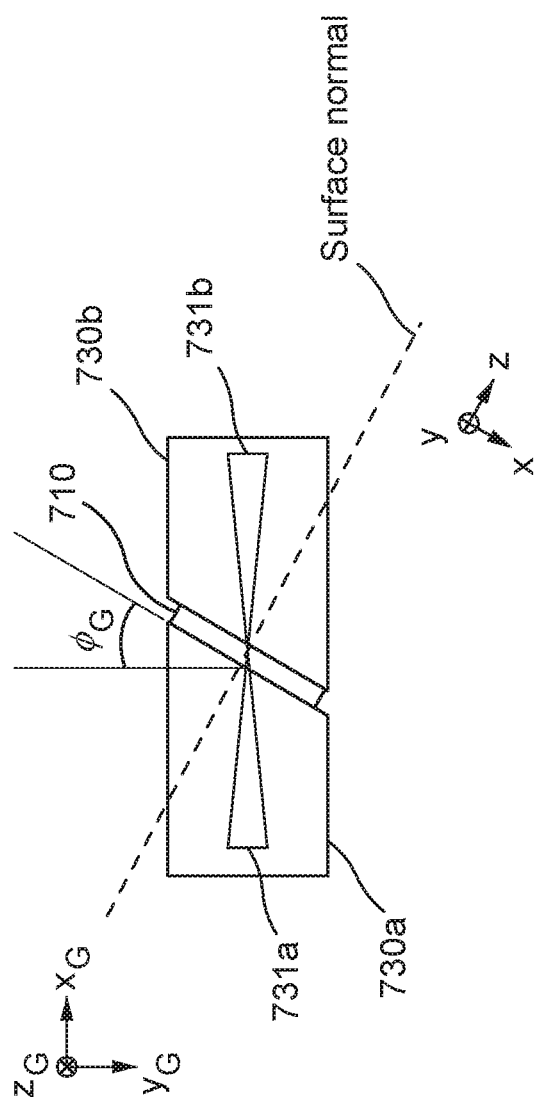

FIGS. 7A-7C show different perspectives of an out-of-plane holographic recording system 700 that can record holographic skew mirrors with wide fields of view. In this holographic recording system 700, a holographic recording medium 710 is disposed between a pair of total internal grazing-extension rotation (TIGER) prisms 730a and 730b (collectively, TIGER prisms 730). The holographic recording medium 710 may also be sandwiched between a pair of transparent substrates (not shown) with index-matching fluid disposed on the surfaces of the transparent substrates contacting the prisms 730. These substrates may transmit 60%, 70%, 80%, 90%, or more of light at visible wavelengths. The TIGER prisms 730 enable introducing recording beams into the holographic recording medium 710 at angles that are inaccessible using in-plane recording geometries because of total internal reflection (TIR) and grazing angles constraints.

FIGS. 7A-7C (and FIGS. 5A-5D) also show the symmetry of the recording beams 731a and 731b (531a and 531b in FIGS. 5A-5D). More specifically, these figures show that the magnitudes angles between the recording beams and the surface normals of the holographic recording medium 710 are substantially equal. Put differently, if recording beam 731a forms a first angle (e.g., 32°) with respect to the holographic recording medium's surface normal, then recording beam 731b and the holographic recording medium's surface normal form an angle with the same magnitude (e.g., −32°). (Here, the recording beams 731 are incident on surfaces of the holographic recording medium 710 that are parallel and therefore have coincident/parallel surface normals.) This holds as the recording beams 731 are rotated with respect to the holographic recording medium 710 as shown in FIGS. 5A-5D.

Figure 7D:
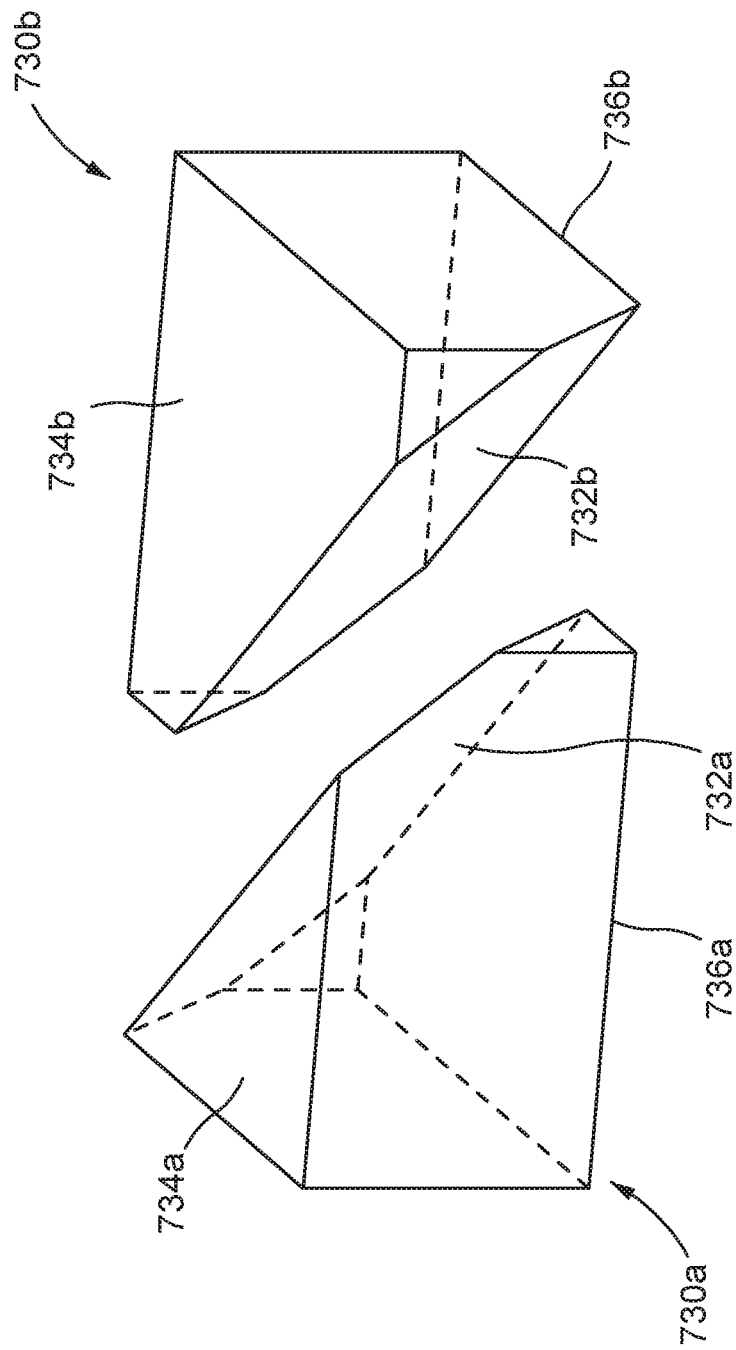
FIG. 7D shows a perspective view of the TIGER prisms used in the holographic recording geometry of FIGS. 7A-7C.

As shown in FIG. 7D, each TIGER prism 730 has a prism primary face 732a, 732b (collectively, primary faces 732) that is oblique to the prism base. In this example, the primary face 732 of each TIGER prism 730 is a hexagonal face residing parallel to and immediately proximate the holographic recording medium 710 where the prism 730 and the holographic recording medium 710 reside in a skew mirror recording system. The obliqueness of the primary faces 730 makes it possible to access out-of-plane recording beam angles and skew angles like those illustrated in FIGS. 5A-5D.

The TIGER prisms 730 can be visualized by imagining a cutting a glass cuboid, or rectangular prism, into two sections. The cut in the cuboid is along a plane that joins a diagonal line connecting adjacent sides of one of the cuboid's faces (prism faces 734a and 734b) with another diagonal line connecting the other two sides of the opposite face of the cuboid (prism faces 736a and 736b). The resulting sections of the cuboid form a matched pair of TIGER prisms 730.

In practice, TIGER prisms can be of any suitable shape, so long as they have oblique faces or facets angled to enable access of out-of-plane recording angles. For instance, a TIGER prism may be formed as a section of any suitable polyhedra, including parallelepipeds and regular right (geometrical prisms). Likewise, the face/facet may oriented or angled as desired and does not necessarily have to result in a symmetric division of a polyhedron. The face (and the holographic recording medium) could also be curved, e.g., to form at least a portion of a spherical, cylindrical, or conical surface. Other surfaces are also possible, including arbitrarily curved or warped surfaces.

The TIGER prisms' oblique primary faces 732 and other faces (e.g., faces 734 and 736) can be used to define the two different coordinate systems shown in FIGS. 7A-7C show. As in the in-plane recording system shown in FIGS. 3A and 3B, axes $x_G$, $y_G$, and $z_G$ are Cartesian coordinates in the frame of reference of the TIGER prisms 730. And axes x, y, and z are Cartesian coordinates (aka standard coordinates) in the frame of reference of the holographic recording medium 710, with the z axis extending normal to the surface of the holographic recording medium 710. The axes x, y, and z are the real-space equivalents of the k-space axes $k_x$, $k_y$, and $k_z$ shown in FIGS. 5A-5D.

FIG. 7C illustrates how the standard coordinate axes are aligned in the prisms of a skew mirror recorder for the case of Tiger prisms. More specifically, it shows a view of the TIGER prisms 730 along the $z_G$ axis with the holographic recording medium 710 sandwiched between them at an angle equal to ϕ. Note that in the illustrated geometry, ϕ has a negative sign (e.g., ϕ=−30.25°). Because the holographic recording medium 710 is tilted with respect to the $y_G$ axis, the conversion from standard coordinates to global coordinates is different for the TIGER prism recording system 700 than for the in-plane recording system 300 shown in FIGS. 3A and 3B. Given the benefit of this disclosure, one skilled in the art will ascertain that standard coordinates may be converted to global coordinates for the case of TIGER prisms by equation (2):

$$\begin{bmatrix} x_G \\ y_G \\ z_G \end{bmatrix} = \begin{bmatrix} \sin\phi & 0 & \cos\phi \\ \cos\phi & 0 & -\sin\phi \\ 0 & 1 & 0 \end{bmatrix} \begin{bmatrix} x \\ y \\ z \end{bmatrix} \begin{bmatrix} x_G \\ y_G \\ z_G \end{bmatrix} = \begin{bmatrix} \sin\phi_G & 0 & \cos\phi_G \\ \cos\phi_G & 0 & -\sin\phi_G \\ 0 & 1 & 0 \end{bmatrix} \begin{bmatrix} x \\ y \\ z \end{bmatrix}. \quad (2)$$

In contrast to the "in-plane" configuration of FIGS. 3A and 3B, which imposes a worst-case angle on the recording beam 331b grazing angle, the TIGER prisms 730 allow the recording medium 710 to be rotated about the $x_G$ axis, "splitting the difference" between the recording beams 731a and 731b grazing angles. Both the TIGER prism configuration 700 and the in-plane configuration 300 can record grating vectors aligned with the $x_G$ axis, and hence result in equivalent written skew mirrors. However, the TIGER prism configuration 700 can also access smaller recording angles and thus can record gratings of lower spatial frequency than the in-plane configuration.

Figure 8A:
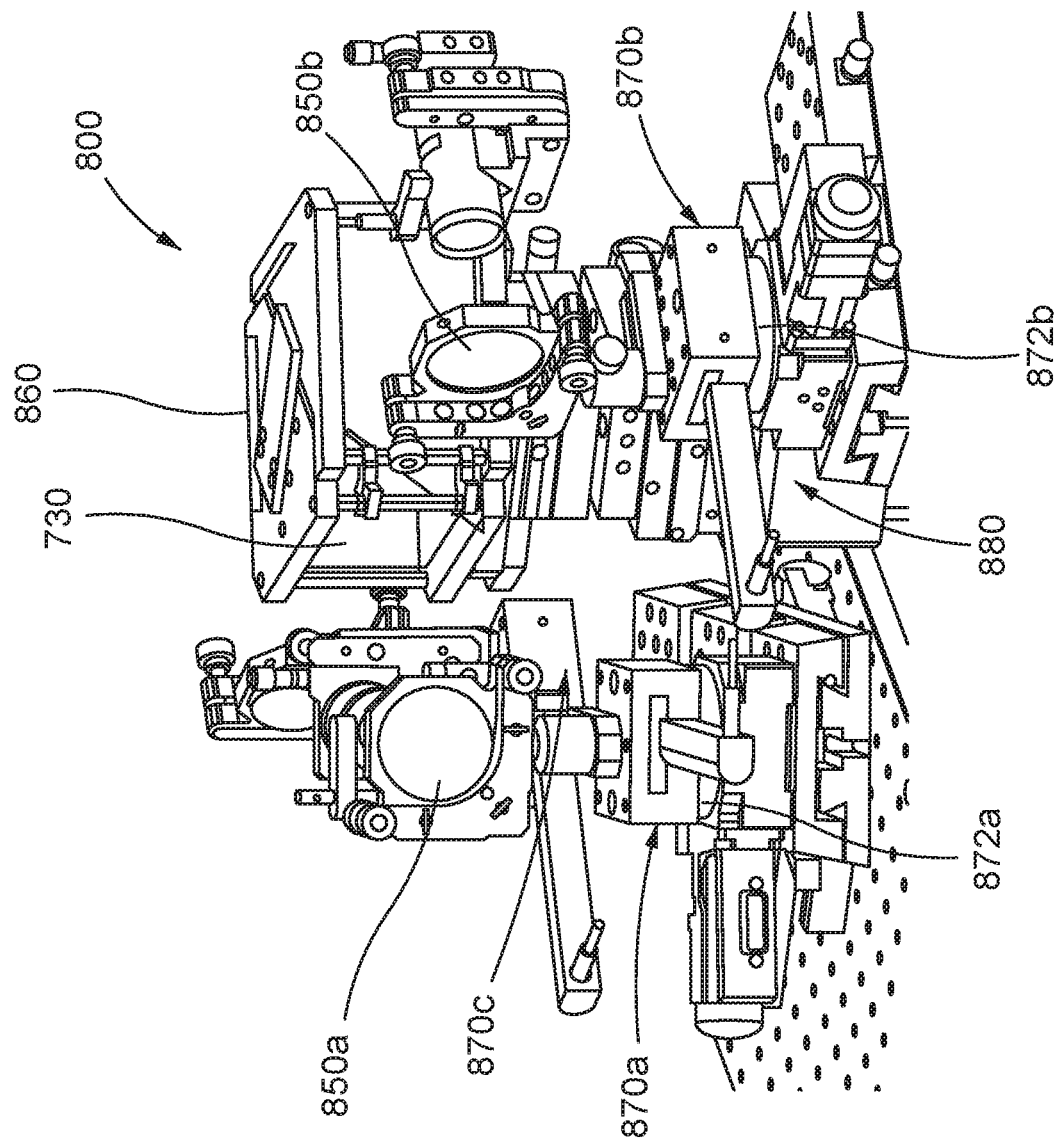

FIGS. 8A-8C show a TIGER prism-based skew mirror recorder 800 that uses TIGER prisms 730 to implement the recording geometry 700 shown in FIGS. 7A-7C for making wide-field-of-view holographic skew mirrors. It includes mirrors 850a and 850b (collectively, mirrors 850) that directed the recording beams 731a and 731b, respectively, to the holographic recording medium 710, which is mounted between the TIGER prisms 730 in a mount 860. The TIGER prism-based skew mirror recorder 800 also includes stages to adjust the angular and translational alignment of the recording beams 731 with respect to the holographic recording medium 730. These stages may include three goniometers 870a-870c (collectively, goniometers 870), a vertical translation stage 880, a rotation stage 872a and 872b (collectively, rotation stages 872) for each mirror 850, and a horizontal translation stage (not shown) for moving the mounted holographic recording medium 710 and TIGER prisms 730 back and forth.

In the case of in-plane recording prisms, refraction correction and other adjustments are typically performed by rotating the mirrors 350 and translating the holographic recording medium. With TIGER prisms, however, there may be desired out-of-plane angle adjustments that cannot be made by rotating the mirrors 850 or translating the holographic recording medium. This is why the TIGER prism skew recorder 800 may be equipped with other actuators, such as the goniometers 870 and vertical stage 880, to perform out-of-plane angle adjustments.

The first goniometer 870a is situated on top of the first rotating stage 872a, beneath rotating mirror 850a, to allow rotation of the mirror 850a about an axis substantially aligned to the horizontal mid-line of the mirror surface. Actuation of the first goniometer 870a allows recording beam 731a to be reflected up or down by up to several degrees out of the $x_G$-$z_G$ plane. Similarly, the second goniometer 870b is situated so as to allow recording beam 731b to also be reflected up or down independently by mirror 850b. The third goniometer 870c similarly allows a mirror (not labeled) upstream of rotating mirror 850a to tip up and down so that, in combination, the first and third goniometers 870a, 870c can produce any desired beam 731a height and vertical angle combination (within mechanical limits). The vertical stage 880 can raise or lower the height ($y_G$ coordinate) of the entire prism package 860, including the recording medium 710.

An additional method for performing the correction would be to add an additional goniometer (not shown) for adjusting the path of recording beam 731b to produce any desired height and vertical angle combination in much the same manner as the first and third goniometers 870a, 870c produce the desired height and vertical angle combination.

Figure 9A:
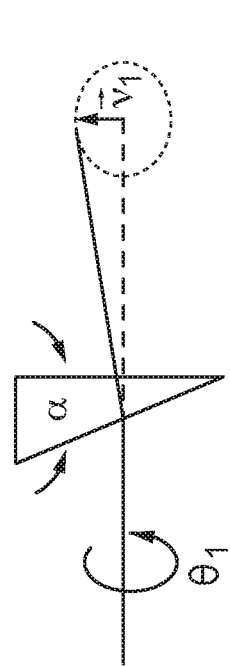
FIG. 9 illustrates angle-correction using pairs of wedges.
Figure 9B:
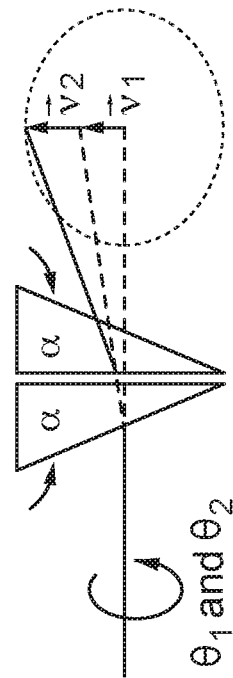
Figure 9C:
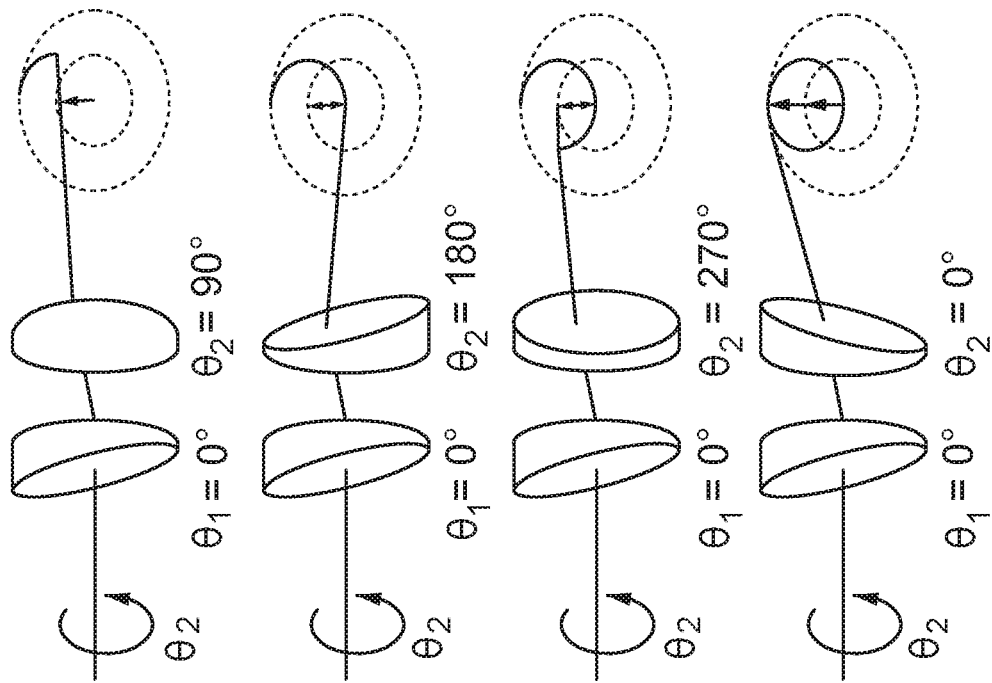

FIG. 9 illustrates another method for achieving this refraction correction uses a pair of optical wedges in rotation mounts which can be aligned with respect to each other to achieve angles within a cone of twice the magnitude that one wedge achieves.

Given the benefit of this disclosure, one skilled in the art will recognize that this configuration will allow small arbitrary vertical angle components to be introduced into each recording beam, while also maintaining overlap between the beams and the recording medium. For instance, one may set a desired vertical angle component of reference beam 731b using goniometer 870b, and then set the vertical stage height so that the reference beam 731b passes through the desired recording region. Then, one may set goniometers 870a and 870c so that the signal beam 731a is introduced at a desired vertical angle at a height matching that set by the vertical stage. Typically, only a few degrees of vertical angle range and a couple centimeters of vertical motion will be sufficient to implement desired refraction correction and other adjustments.

Selecting Interbeam and Skew Angles for Out-of-Plane Holographic Skew Mirrors

The out-of-plane skew mirror recorder 800 shown in FIGS. 8A-8C can be used to make wide field-of-view holographic skew mirror by recording one or more volume holograms within the volume of the holographic recording medium. The interbeam and skew angles chosen to record these holograms depend on the desired field of view and operating wavelength range of the holographic skew mirror.

In some cases, the out-of-plane skew mirror recorder 800 may be used to record many discrete gratings, each of which principally reflects light at one or more wavelengths over a different, narrow range of incident angles. If these ranges of incident angles overlap or are close to each other, the gratings will reflect light over a wide range of incident angles to provide a wide field of view. Alternatively, the holographic skew mirror may include a holographic grating that is written by continuously recording the interference between a pair of recording beams as the interbeam angle is varied. This continuously recorded grating reflects light over wide range of incident angles to provide a wide field of view. Other combinations of grating are also possible, e.g., to produce a holographic skew mirror that reflects light over certain ranges of angles of incidence but not others, or certain ranges of wavelengths but no others.

In at least one example, the vector form of Snell's law may be used to calculate the direction of a recording beam upon refraction at an internal boundary between a recording medium and a prism. As understood by those skilled in the art of holography, the vector form of Snell's law describes what happens to light rays that impinge on an optical boundary, such as a prism surface, at an angle that includes non-zero components in more than one coordinate axis. The vector form of Snell's law gives the resulting refraction at such a surface as:

$$\hat{s}'_2 = \frac{n_1}{n_2}[\hat{N} \times (-\hat{N} \times \hat{s}_1)] - \hat{N}\sqrt{1 - \left(\frac{n_1}{n_2}\right)^2 (\hat{N} \times \hat{s}_1) \cdot (\hat{N} \times \hat{s}_1)} \quad (3)$$

where $\hat{N}$ is the unit normal vector of the optical boundary, $\hat{s}_1$ and $\hat{s}_2$ are the normalized incident and refracted ray direction vectors, and $n_1$ and $n_2$ are the refractive indices of the first and second materials. For TIGER prisms, such a refraction typically includes non-zero components in more than one axis of the global coordinate system.

In some embodiments, refractive index mismatches between optical elements such as a recording medium and a recording prism are corrected using Snell's law. For instance, an internal ray direction vector $\hat{s}_{S,int}$ might be desired for a signal beam within recording medium 710 (FIGS. 7A-7D and 8A-8C) during a recording exposure. In order to determine the external angle that must be applied to produce $\hat{s}_{S,int}$ at internal angle $\theta_G$ within medium 710. To this purpose, Snell's law may be applied at the internal boundary between recording prism 730a and recording medium 710 to determine $\hat{s}_{S,prism}$, the ray direction vector within prism 730a (note that even a small index mismatch may produce significant refraction). Then, Snell's law may be may be again applied at the external surface of recording prism 730b to determine the external ray direction vector $\hat{s}_{S,ext}$ from $\hat{s}_{S,prism}$. External ray direction vector $\hat{s}_{S,ext}$ thus directly determines $\theta_G$, which may be set by rotating mirror 850b. Similarly, the angle for rotating mirror 850a may be determined from the desired reference ray direction vector $\hat{s}_{R,int}$ by tracing through the internal and external surfaces of recording prism 730a.

In some embodiments, adjustments to recording angles may be performed for reasons other than refraction correction. Examples of other adjustments include dispersion compensation, media shrinkage pre-compensation, and empirical adjustments to improve the modulation transfer function (MTF) or color plane separation. For instance, these adjustments may be made to compensate for instrument error, shrinkage, index mismatch, etc. Such error can be determined empirically by writing a complete test skew mirror with (imperfect) holograms and ascertaining the holograms' imperfections by measuring the test skew mirror's angular dispersion as a function of wavelength. These measurements can be used to adjust the design angles. Once the design angles have been adjusted, it is possible to record holographic skew mirrors that are virtually free of imperfections.

A Wide Field-of-View Holographic Skew Mirror

In practice, an out-of-plane skew mirror recorder can create a holographic skew mirror with a wide field of view by recording one or more (e.g., tens, hundreds, or thousands) of holographic gratings within a holographic recording medium. Writing a discrete set of gratings over a series of exposures as opposed to a single grating in a single continuous exposure with angularly scanning beams offers several advantages. First, it reduces the need to suppress or compensate vibration during exposure. Second, compared to a continuous grating, discrete gratings preserve the change in refractive index, Δn, at the expense of spectrally subsampling incoming light (the discrete gratings apply a reflective comb function to light illuminating skew mirror). Third, picking the grating spacing to match the light source's spectrum makes the device more efficient.

Figure 10:
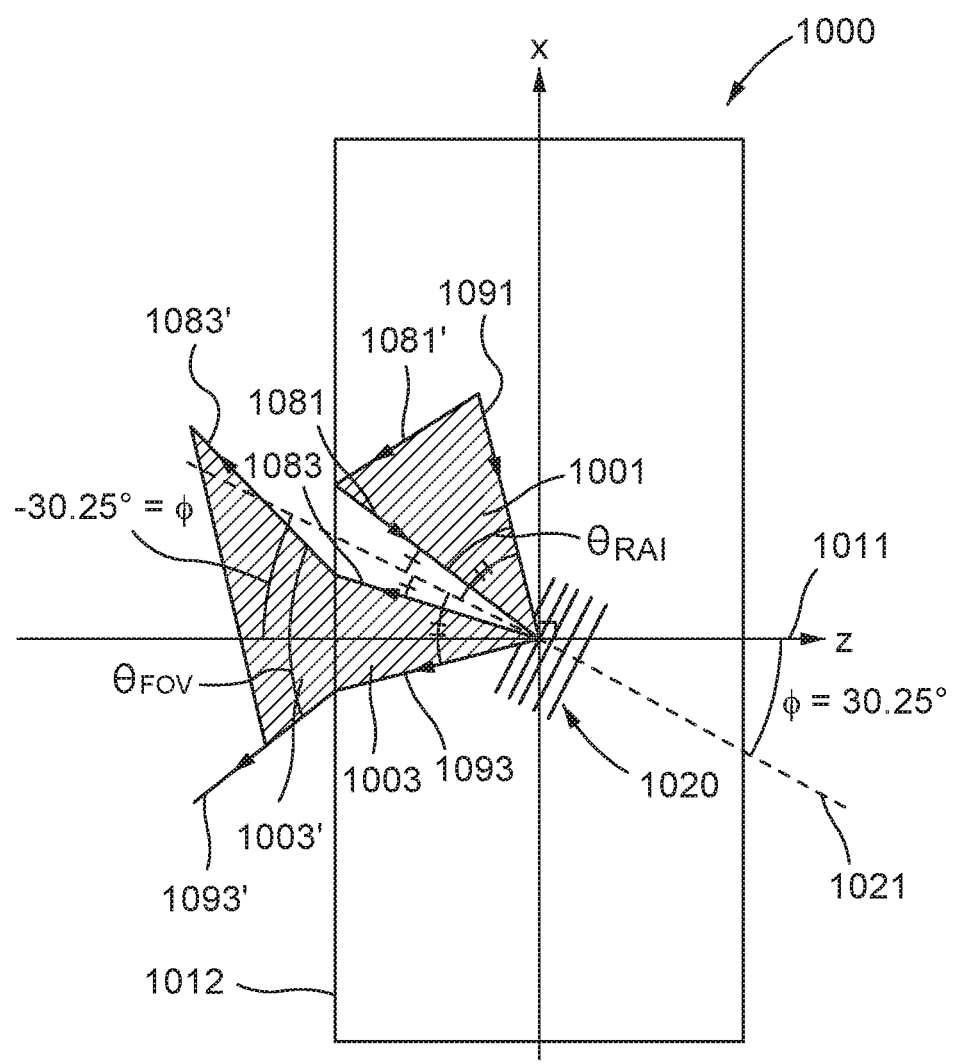
FIG. 10 shows a plan view of a holographic skew input/output coupler with a 60° diagonal field of view (53.4° horizontal field-of-view, 31.6° horizontal field-of-view, and 16:9 aspect ratio) made using an out-of-plane holographic recording system.

FIG. 10 shows a wide field-of-view holographic input/output coupler 1000 made using an out-of-plane writing geometry. The holographic skew input/output coupler 1000 comprises a holographic grating structure 1020 recorded in a holographic grating medium 1010, which may be about 100 microns thick or thicker. The grating structure 1020 comprises 228 gratings, each of which is recorded with a different interbeam recording beam angle and hence has a different grating frequency ($|K_G|$) at the recording wavelength. These gratings are oriented about a skew axis 1021 that forms a skew angle of about $\phi=-30.25°$ with respect to a surface normal 1011 of the holographic grating medium 1010. In practice, other skew angles are possible, e.g., skew angles greater than 2.0°, 5.0°, 10.0°, 15.0°, 30.0°, 45.0°, 60.0°, and so on. The skew angles may range from about 15.0° to about 45.0° (e.g., about 20.0° to about 40.0°, about 25.0° to about 35.0°, about 27.5° to about 32.5°, and so on).

Together, the gratings cause the holographic skew mirror 1000 to reflect internally incident light about a substantially constant reflective axis 1021 at incident angles ranging from 13.1° to 47.6°, for a range of incidence angles $\theta_{RAI}=34.5°$, as measured from the reflective axis 1021. This corresponds to a field of view as measured in air outside the holographic grating medium of about $\theta_{FOV}=54.3°$. Rays propagating within shaded region 1001, which spans a range of angles measuring from 13.1° to 47.6° with respect to the skew axis 1021 (an angular range of about 34.5°) illuminate the grating structure 1020. The grating structure 1020 principally reflects this light into shaded region 1003, which spans the same angular range (−13.1° to −47.6°) on the other side of the skew axis 1021. The principally reflected light with the third shaded region 1003 refracts at the surface 1020 into a fourth shaded region 1003' spanning a horizontal field of view of about 54.3°.

Referring to FIG. 10, this means that incident light following ray 1091 at an angle of 47.6° measured from the skew axis 1021 reflects off the grating structure 1020 along ray 1093 that is symmetric with ray 1091 about the skew axis 1021. This principally reflected light 1093 refracts at the surface 1012 along ray 1093'. Similarly, incident light following ray 1081' totally internally reflects off the surface 1012 of the holographic skew mirror 1000 along ray 1081 at an angle of 13.1° measured from the skew axis 1021. The grating structure 1020 reflects this incident light into along ray 1083 that is symmetric with ray 1081 about the skew axis 1021. And this principally reflected light 1083 refracts at the surface 1012 along ray 1083'.

Figure 11:
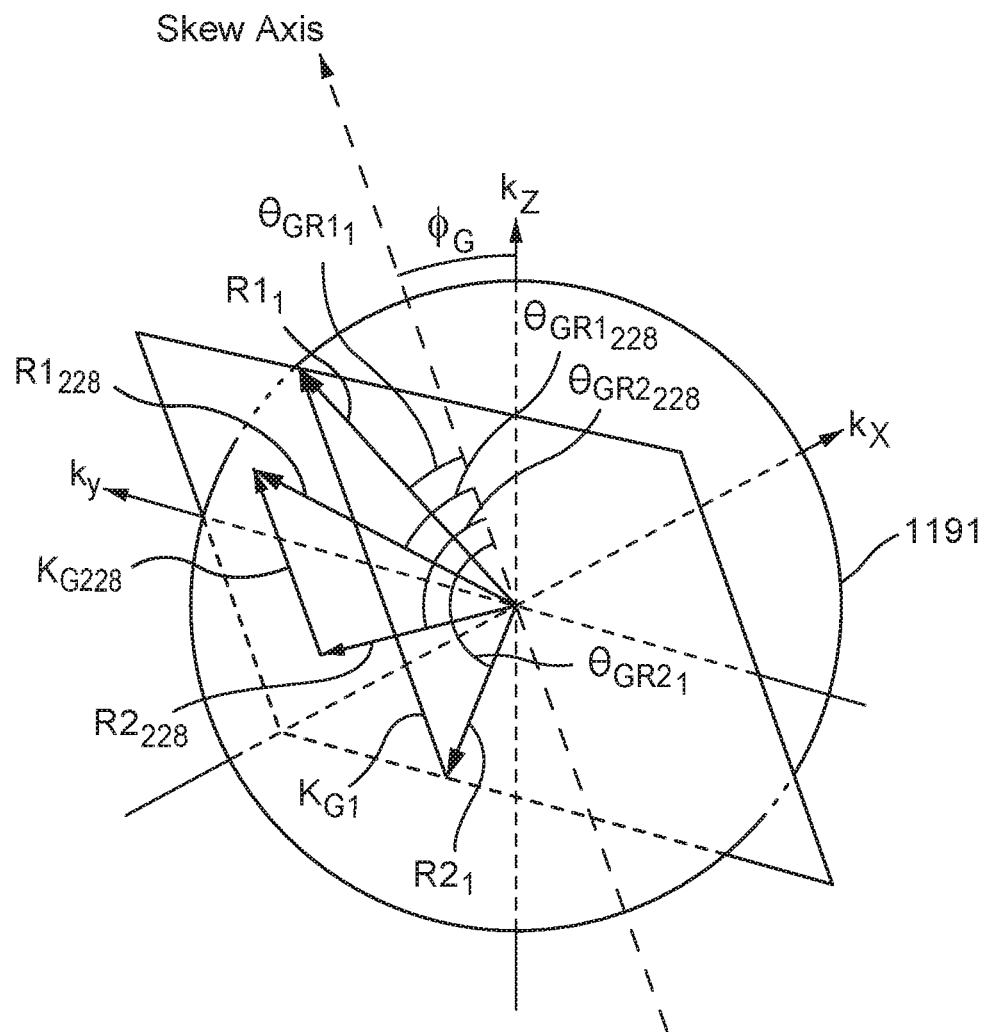
FIG. 11 shows a k-space representation of the recording beams for the first and $228^{th}$ gratings in the holographic skew mirror of FIG. 10.

FIG. 11 shows a k-space representation of the grating vectors for a first grating $K_{G1}$ and a $228^{th}$ grating $K_{G228}$ along with the wave vectors for the recording beams used to record the gratings. The grating and wave vectors are shown with respect to k-sphere 1191 for the holographic grating medium 1020, which has a refractive index of about 1.5471 at a recording wavelength of 405 nm. When projected into a plane, the tips of the grating and wave vectors lie on an ellipse. First and second recording beam wave vectors for the first grating, $R1_1$ and $R2_1$, respectively, form angles in the holographic grating medium of 32.0° and 148.0°, respectively, with respect to the reflective axis 1021 to produce a first grating with a grating frequency of about $4.1 \times 10^7$ rad/m. The wave vectors for the $228^{th}$ grating, $R1_{228}$ and $R2_{228}$, form angles in the holographic grating medium of 64.1° and 115.9°, respectively, with respect to the skew axis 1021 to produce a $228^{th}$ grating with a grating frequency of about $2.1 \times 10^7$ rad/m. Each grating vector is angled at −30.25° relative to the surface normal 1011.

This grating vectors in the grating structure 1020 of FIG. 10 span a range of grating frequencies that extends about $2.0 \times 10^7$ rad/m. Other grating frequencies and ranges of grating frequencies are also possible; in practice, range of grating frequencies, or difference between the maximum and minimum grating frequency, may be about $2.00 \times 10^5$ radians per meter to about $3.15 \times 10^7$ radians per meter (e.g., about $2.00 \times 10^5$ radians per meter, $1.68 \times 10^6$ radians per meter, $5.01 \times 10^6$ radians per meter, $1.24 \times 10^7$ radians per meter, $3.15 \times 10^7$ radians per meter, or any other value or sub-range).

The gratings may be spaced uniformly or non-uniformly in k-space. For about 228 uniformly spaced gratings with grating frequencies of between about $2.1 \times 10^7$ rad/m and about $4.1 \times 10^7$ rad/m, the difference in grating frequency between adjacent grating vectors is about $8.68 \times 10^4$ rad/m. Other spacings are also possible, including spacings within a range of about $5.0 \times 10^3$ rad/m and $1.0 \times 10^7$ rad/m. Non-uniform spacing is also possible, e.g., if the holographic skew mirror should reflect light at some wavelengths or angles but not others. For instance, the grating frequencies may be selected based on the spectrum of the incident light and/or the range of expected incidence angles for increased efficiency.

Because each grating has a different grating frequency, each grating reflects light from a different incident angle to a different principally reflected angle. The range of possible angles of incidence depends on the range of grating frequencies and determines the field of view. For example, each grating may reflect light at one wavelength (e.g., 460 nm, 518 nm, or 618 nm), two wavelengths (e.g., 460 nm and 518 nm or 518 nm and 618 nm), three wavelengths (e.g., 460 nm, 518 nm, and 618 nm), or more. Gratings may reflect light at visible wavelengths, near infrared (NIR) wavelengths, near ultraviolet wavelengths, or combinations thereof. This enables the skew mirror to reflect narrowband light (e.g., light from a laser), broadband light (e.g., light from an organic light-emitting diode (OLED)), and even natural light (e.g., sunlight).

For an input/output coupler, the skew axis may be selected to couple light into or out of the grating medium at angles near the surface normal, e.g., as shown in FIG. 10. In these cases, the skew angle may be based on the critical angle for total internal reflection, which is about 40.81° at a boundary between air and the grating medium (e.g., n=1.53 at visible wavelengths).

Table 1 lists recording beam angles and grating frequencies for each of the 228 uniformly spaced gratings. First recording beam angle $\theta_{R1}$ and second recording beam angle $\theta_{R2}$ are relative to a skew axis having a skew angle of −30.25 degrees relative to surface normal of the recording medium. Accordingly, grating vectors listed in Table 1 are oriented at −30.25 degrees relative to surface normal of the recording medium, which is referred to as a grating medium after all 228 gratings are recorded. $\theta_{R1}$ and $\theta_{R2}$ are analogous to $\theta_{GR1}$ and $\theta_{GR2}$ respectively, as illustrated in FIG. 7B, except that $\theta_{R1}$ and $\theta_{R2}$ are measured within medium 710, no prism 730.

Collectively, the 228 gratings in Table 1 are structured to reflect incident light at 460 nm, 518 nm, and 618 nm about a substantially constant reflective axis, at angles of incidence ranging from 13.1-47.6 degrees (a range of 34.5 degrees) relative to the reflective axis. The reflective axis has a reflective axis angle of −30.25 degrees relative to surface normal. The gratings can be grouped into three overlapping subsets, each of which is structured to reflect incident light of a specified wavelength about the reflective axis, at a range of incidence angles.

Subset 1, comprising gratings 1 through 146, is structured to reflect incident light (which can be referred to as a probe beam) at or near 460 nm (e.g., over 20-40 nm band centered at 460 nm) about the substantially constant reflective axis, at angles of incidence ranging from 13.1 to 47.7 degrees relative to the reflective axis. Gratings 1 through 228 (i.e., all of the gratings in Table 1), collectively can reflect incident light at 460 nm about the substantially constant reflective axis, at angles of incidence ranging from 13.1 to 59.8 degrees (a range of 46.7 degrees) relative to the reflective axis. The range from 13.1 to 47.6 degrees is of interest for the skew mirror structured to reflect blue, green, and red light at common incidence angles relative to the substantially constant reflective axis.

Subset 2, comprising gratings 53 through 182, is structured to reflect incident light at 518 nm about the substantially constant reflective axis, at angles of incidence ranging from 12.8 to 47.7 degrees relative to the reflective axis. Collectively, gratings 43 through 228 can reflect incident light at 518 nm about the substantially constant reflective axis, at angles of incidence ranging from 3.1 to 55.6 degrees (a range of 52.5 degrees) relative to the reflective axis. The range from 13.1 to 47.6 is of interest for purposes of the present discussion.

Subset 3, comprising gratings 120 through 228, is structured to reflect incident light at 618 nm about the substantially constant reflective axis, at angles of incidence ranging from 12.5 to 47.6 degrees relative to the reflective axis. Gratings 112 through 228 are structured to reflect incident light at 618 nm about the substantially constant reflective axis, at angles of incidence ranging from 3.0 to 47.6 degrees (a range of 44.6 degrees) relative to the reflective axis. The range from 13.1 to 47.6 is of interest for purposes of the present discussion.

At least gratings 198 through 228 cannot be recorded using in-plane recording such as illustrated in FIGS. 3A and 3B because the in-plane recording geometry results in impermissible recording beam angles of 90 degrees and greater relative to surface normal of the recording medium. Practically speaking, even gratings 115 through 198, although theoretically possible, would likely problematic using in-plane architecture because recording beam angles approach a grazing condition (i.e., approach 90 degrees). Out-of-plane recording using TIGER prisms, such as illustrated in FIGS. 7A-7C, enables writing all gratings in Table 1.

Selecting Recording Beam Angles and Exposure Times

Computer code can be used to compute the writing beam angles and exposure times for making a holographic skew mirror with an out-of-plane writing geometry. The following snippet of computer code calculates the horizontal and vertical fields of view from the diagonal field of view. As mentioned above, this holographic skew mirror 1000 has a 60° diagonal field of view (measured outside the holographic recording medium 1020). When the variable g.aspect=9/16, it also has an aspect ratio of 16:9, which is common for many displays:

```
g.dFoV = 60;                              % diagonal angle
g.dia = 2 * tand( g.dFoV/2);              % diagonal size @ dist=1.0
g.width = g.dia * cos( atan( g.aspect));
g.height = g.dia * sin( atan( g.aspect));
g.vFoV = 2 * atand( g.height/2);
g.hFoV = 2 * atand( g.width/2);
```

A 60° diagonal field of view and a 16:9 aspect ratio correspond to a 53.4° horizontal field of view and a 31.6° vertical (Bragg degenerate) field of view (again, as measured outside the holographic recording medium). (The choice of orientation is arbitrary and could be reversed, i.e., the horizontal field of view could be 31.6° and the vertical field of view could be 53.4°.) For a holographic recording medium with a refractive index of about 1.5 (e.g., n=1.53), the range of horizontal incident angles on the holographic gratings measured inside the medium is about 35° (e.g., 34.17°).

Figure 12:
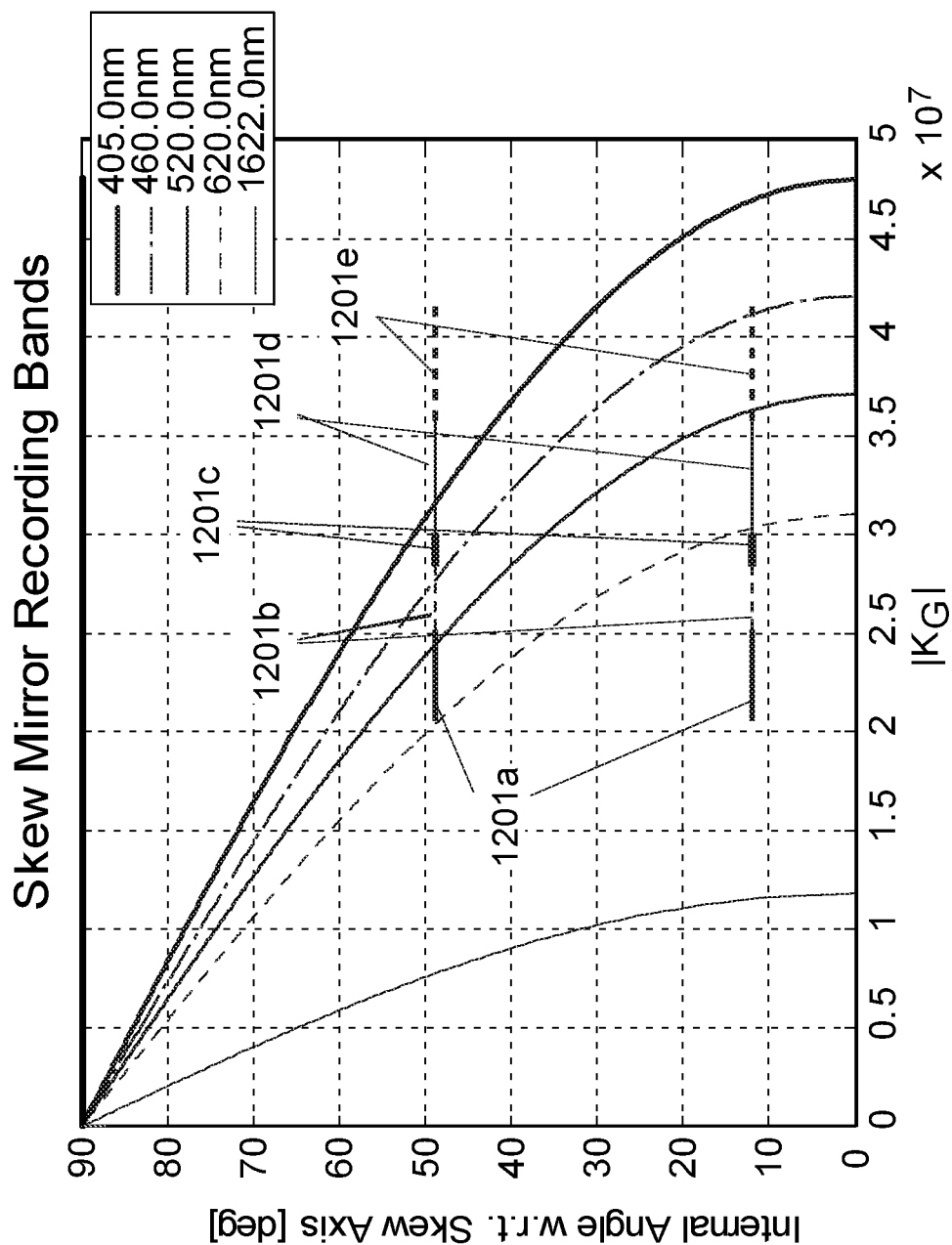
FIG. 12 is a plot of skew mirror internal angle recording bands for a 53.4° field-of-view holographic skew mirror output coupler.

FIG. 12 illustrates a set of curves, produced by a different computer code, illustrating the holograms (holographic gratings) for each color band. These curves represent the skew mirror internal angle wavelength bands 1201a-1201e for a holographic output coupler with a 53.4° horizontal field-of-view. The left bands 1201a represent holograms that reflect red light. The middle bands 1201c represent holograms that are used for all three color bands. The middle-left bands 1201b represent holograms that are shared for the green and red band. The middle-right bands 1201d represent holograms shared for the blue and green bands. And the right bands 1201e represent holograms that reflect blue light.

The code also produced a table of recording parameters, shown below in Table 1. The parameters were selected to support the 53.4° horizontal field-of-view for an output coupler at the red-green-blue (RGB) color bands centered at 620 nm, 520 nm, and 460 nm, respectively.

The 228 rows of Table 1 correspond to 228 exposures for programming the skew mirror using the out-of-plane writing geometry and system shown in FIGS. 7A-7D and 8A-8C. The first column, Global Angle, indicates the angle $\theta_G$ of signal beam 731a (FIG. 7A) with respect to the $x_G$ axis inside the medium, which is set by rotating mirror 850a (FIG. 8A). Rotating mirror 850b is set to deliver reference beam 731b at an angle of $180°-\theta_G$ inside the medium. Column 3, Adjustment Angle, is used to set the goniometers 870 to produce the indicated out-of-plane angular components for both beams 731 inside the medium. The adjustments are of equal magnitude but opposite sign for the two beams 731, so that the signal beam is delivered with an upward angle and the reference beam is delivered with a downward angle of the same magnitude or vice versa. A linear stage and the vertical stage 880 are set to center the recording medium 710 at the intersection of the recording beams 731. Then a shutter is opened to expose the recording medium 710 for the time indicated in column 2. All exposures in Table 1 are so recorded, and then the recording medium 710 is removed from the skew mirror recorder and post-cured with an incoherent UV LED source immediately after exposure.

TABLE 1

RECORDING PARAMETERS FOR A SKEW MIRROR EMBODIMENT

| Grating Number | $\theta_{R1}$ First Recording Beam Angle (degrees)* | $\theta_{R2}$ Second Recording Beam Angle (degrees)* | Interbeam Angle (α) (degrees) | $|K_G|$ Grating Frequency (rad/m)** | Exposure Time (seconds) |
|---|---|---|---|---|---|
| 1 | 32.00 | 148.00 | 116.00 | 4.0709E+07 | 9.9473E-01 |
| 2 | 32.20 | 147.80 | 115.61 | 4.0622E+07 | 7.4488E-01 |
| 3 | 32.39 | 147.61 | 115.22 | 4.0535E+07 | 7.4502E-01 |
| 4 | 32.58 | 147.42 | 114.83 | 4.0448E+07 | 7.4517E-01 |
| 5 | 32.78 | 147.22 | 114.45 | 4.0361E+07 | 7.4532E-01 |
| 6 | 32.97 | 147.03 | 114.07 | 4.0275E+07 | 7.4547E-01 |
| 7 | 33.16 | 146.84 | 113.69 | 4.0188E+07 | 7.4562E-01 |
| 8 | 33.35 | 146.65 | 113.31 | 4.0101E+07 | 7.4577E-01 |
| 9 | 33.53 | 146.47 | 112.93 | 4.0014E+07 | 7.4592E-01 |
| 10 | 33.72 | 146.28 | 112.56 | 3.9927E+07 | 7.4607E-01 |
| 11 | 33.91 | 146.09 | 112.19 | 3.9840E+07 | 7.4622E-01 |
| 12 | 34.09 | 145.91 | 111.82 | 3.9754E+07 | 7.4636E-01 |
| 13 | 34.28 | 145.72 | 111.45 | 3.9667E+07 | 7.4651E-01 |
| 14 | 34.46 | 145.54 | 111.08 | 3.9580E+07 | 7.4666E-01 |
| 15 | 34.64 | 145.36 | 110.71 | 3.9493E+07 | 7.4681E-01 |
| 16 | 34.82 | 145.18 | 110.35 | 3.9406E+07 | 7.4696E-01 |
| 17 | 35.01 | 144.99 | 109.99 | 3.9319E+07 | 7.4711E-01 |
| 18 | 35.19 | 144.81 | 109.63 | 3.9232E+07 | 7.4726E-01 |
| 19 | 35.37 | 144.63 | 109.27 | 3.9146E+07 | 7.4741E-01 |
| 20 | 35.54 | 144.46 | 108.91 | 3.9059E+07 | 7.4756E-01 |
| 21 | 35.72 | 144.28 | 108.56 | 3.8972E+07 | 7.4770E-01 |
| 22 | 35.90 | 144.10 | 108.20 | 3.8885E+07 | 7.4785E-01 |
| 23 | 36.08 | 143.92 | 107.85 | 3.8798E+07 | 7.4800E-01 |
| 24 | 36.25 | 143.75 | 107.50 | 3.8711E+07 | 7.4815E-01 |
| 25 | 36.43 | 143.57 | 107.15 | 3.8625E+07 | 7.4830E-01 |
| 26 | 36.60 | 143.40 | 106.80 | 3.8538E+07 | 7.4845E-01 |
| 27 | 36.77 | 143.23 | 106.45 | 3.8451E+07 | 7.4860E-01 |
| 28 | 36.95 | 143.05 | 106.11 | 3.8364E+07 | 7.4875E-01 |

TABLE 1-continued

RECORDING PARAMETERS FOR A SKEW MIRROR EMBODIMENT

| Grating Number | $\theta_{R1}$ First Recording Beam Angle (degrees)* | $\theta_{R2}$ Second Recording Beam Angle (degrees)* | Interbeam Angle ($\alpha$) (degrees) | $|K_G|$ Grating Frequency (rad/m)** | Exposure Time (seconds) |
|---|---|---|---|---|---|
| 29 | 37.12 | 142.88 | 105.76 | 3.8277E+07 | 7.4890E−01 |
| 30 | 37.29 | 142.71 | 105.42 | 3.8190E+07 | 7.4904E−01 |
| 31 | 37.46 | 142.54 | 105.08 | 3.8104E+07 | 7.4919E−01 |
| 32 | 37.63 | 142.37 | 104.74 | 3.8017E+07 | 7.4934E−01 |
| 33 | 37.80 | 142.20 | 104.40 | 3.7930E+07 | 7.4949E−01 |
| 34 | 37.97 | 142.03 | 104.06 | 3.7843E+07 | 7.4964E−01 |
| 35 | 38.14 | 141.86 | 103.72 | 3.7756E+07 | 7.4979E−01 |
| 36 | 38.31 | 141.69 | 103.39 | 3.7669E+07 | 7.4994E−01 |
| 37 | 38.47 | 141.53 | 103.06 | 3.7582E+07 | 7.5009E−01 |
| 38 | 38.64 | 141.36 | 102.72 | 3.7496E+07 | 7.5024E−01 |
| 39 | 38.80 | 141.20 | 102.39 | 3.7409E+07 | 7.5039E−01 |
| 40 | 38.97 | 141.03 | 102.06 | 3.7322E+07 | 7.5053E−01 |
| 41 | 39.13 | 140.87 | 101.73 | 3.7235E+07 | 7.5068E−01 |
| 42 | 39.30 | 140.70 | 101.40 | 3.7148E+07 | 7.5083E−01 |
| 43 | 39.46 | 140.54 | 101.08 | 3.7061E+07 | 7.5098E−01 |
| 44 | 39.62 | 140.38 | 100.75 | 3.6975E+07 | 7.5113E−01 |
| 45 | 39.79 | 140.21 | 100.43 | 3.6888E+07 | 7.5128E−01 |
| 46 | 39.95 | 140.05 | 100.10 | 3.6801E+07 | 7.5143E−01 |
| 47 | 40.11 | 139.89 | 99.78 | 3.6714E+07 | 7.5158E−01 |
| 48 | 40.27 | 139.73 | 99.46 | 3.6627E+07 | 7.5173E−01 |
| 49 | 40.43 | 139.57 | 99.14 | 3.6540E+07 | 7.5187E−01 |
| 50 | 40.59 | 139.41 | 98.82 | 3.6454E+07 | 7.5202E−01 |
| 51 | 40.75 | 139.25 | 98.50 | 3.6367E+07 | 7.5217E−01 |
| 52 | 40.91 | 139.09 | 98.19 | 3.6280E+07 | 7.5232E−01 |
| 53 | 41.06 | 138.94 | 97.87 | 3.6193E+07 | 7.5247E−01 |
| 54 | 41.22 | 138.78 | 97.55 | 3.6106E+07 | 7.5262E−01 |
| 55 | 41.38 | 138.62 | 97.24 | 3.6019E+07 | 7.6572E−01 |
| 56 | 41.54 | 138.46 | 96.93 | 3.5932E+07 | 7.6587E−01 |
| 57 | 41.69 | 138.31 | 96.62 | 3.5846E+07 | 7.6602E−01 |
| 58 | 41.85 | 138.15 | 96.30 | 3.5759E+07 | 7.6617E−01 |
| 59 | 42.00 | 138.00 | 95.99 | 3.5672E+07 | 7.6632E−01 |
| 60 | 42.16 | 137.84 | 95.68 | 3.5585E+07 | 7.6647E−01 |
| 61 | 42.31 | 137.69 | 95.38 | 3.5498E+07 | 7.6662E−01 |
| 62 | 42.47 | 137.53 | 95.07 | 3.5411E+07 | 7.6677E−01 |
| 63 | 42.62 | 137.38 | 94.76 | 3.5325E+07 | 7.6691E−01 |
| 64 | 42.77 | 137.23 | 94.46 | 3.5238E+07 | 7.6706E−01 |
| 65 | 42.92 | 137.08 | 94.15 | 3.5151E+07 | 7.6721E−01 |
| 66 | 43.08 | 136.92 | 93.85 | 3.5064E+07 | 7.6736E−01 |
| 67 | 43.23 | 136.77 | 93.54 | 3.4977E+07 | 7.6751E−01 |
| 68 | 43.38 | 136.62 | 93.24 | 3.4890E+07 | 7.6766E−01 |
| 69 | 43.53 | 136.47 | 92.94 | 3.4804E+07 | 7.6781E−01 |
| 70 | 43.68 | 136.32 | 92.64 | 3.4717E+07 | 7.6796E−01 |
| 71 | 43.83 | 136.17 | 92.34 | 3.4630E+07 | 7.6811E−01 |
| 72 | 43.98 | 136.02 | 92.04 | 3.4543E+07 | 7.6826E−01 |
| 73 | 44.13 | 135.87 | 91.74 | 3.4456E+07 | 7.6840E−01 |
| 74 | 44.28 | 135.72 | 91.45 | 3.4369E+07 | 7.6855E−01 |
| 75 | 44.43 | 135.57 | 91.15 | 3.4282E+07 | 7.6870E−01 |
| 76 | 44.57 | 135.43 | 90.85 | 3.4196E+07 | 7.6885E−01 |
| 77 | 44.72 | 135.28 | 90.56 | 3.4109E+07 | 7.6900E−01 |
| 78 | 44.87 | 135.13 | 90.26 | 3.4022E+07 | 7.6915E−01 |
| 79 | 45.01 | 134.99 | 89.97 | 3.3935E+07 | 7.6930E−01 |
| 80 | 45.16 | 134.84 | 89.68 | 3.3848E+07 | 7.6945E−01 |
| 81 | 45.31 | 134.69 | 89.39 | 3.3761E+07 | 7.6960E−01 |
| 82 | 45.45 | 134.55 | 89.10 | 3.3675E+07 | 7.6974E−01 |
| 83 | 45.60 | 134.40 | 88.80 | 3.3588E+07 | 7.6989E−01 |
| 84 | 45.74 | 134.26 | 88.51 | 3.3501E+07 | 7.7004E−01 |
| 85 | 45.89 | 134.11 | 88.23 | 3.3414E+07 | 7.7019E−01 |
| 86 | 46.03 | 133.97 | 87.94 | 3.3327E+07 | 7.7034E−01 |
| 87 | 46.18 | 133.82 | 87.65 | 3.3240E+07 | 7.7049E−01 |
| 88 | 46.32 | 133.68 | 87.36 | 3.3154E+07 | 7.7064E−01 |
| 89 | 46.46 | 133.54 | 87.08 | 3.3067E+07 | 7.7079E−01 |
| 90 | 46.60 | 133.40 | 86.79 | 3.2980E+07 | 7.7094E−01 |
| 91 | 46.75 | 133.25 | 86.51 | 3.2893E+07 | 7.7108E−01 |
| 92 | 46.89 | 133.11 | 86.22 | 3.2806E+07 | 7.7123E−01 |
| 93 | 47.03 | 132.97 | 85.94 | 3.2719E+07 | 7.7138E−01 |
| 94 | 47.17 | 132.83 | 85.65 | 3.2632E+07 | 7.7153E−01 |
| 95 | 47.31 | 132.69 | 85.37 | 3.2546E+07 | 7.7168E−01 |
| 96 | 47.45 | 132.55 | 85.09 | 3.2459E+07 | 7.7183E−01 |
| 97 | 47.60 | 132.40 | 84.81 | 3.2372E+07 | 7.7198E−01 |
| 98 | 47.74 | 132.26 | 84.53 | 3.2285E+07 | 7.7213E−01 |
| 99 | 47.88 | 132.12 | 84.25 | 3.2198E+07 | 7.7228E−01 |
| 100 | 48.01 | 131.99 | 83.97 | 3.2111E+07 | 7.7242E−01 |
| 101 | 48.15 | 131.85 | 83.69 | 3.2025E+07 | 7.7257E−01 |

TABLE 1-continued

RECORDING PARAMETERS FOR A SKEW MIRROR EMBODIMENT

| Grating Number | $\theta_{R1}$ First Recording Beam Angle (degrees)* | $\theta_{R2}$ Second Recording Beam Angle (degrees)* | Interbeam Angle ($\alpha$) (degrees) | $|K_G|$ Grating Frequency (rad/m)** | Exposure Time (seconds) |
|---|---|---|---|---|---|
| 102 | 48.29 | 131.71 | 83.41 | 3.1938E+07 | 7.7272E-01 |
| 103 | 48.43 | 131.57 | 83.14 | 3.1851E+07 | 7.7287E-01 |
| 104 | 48.57 | 131.43 | 82.86 | 3.1764E+07 | 7.7302E-01 |
| 105 | 48.71 | 131.29 | 82.58 | 3.1677E+07 | 7.7317E-01 |
| 106 | 48.85 | 131.15 | 82.31 | 3.1590E+07 | 7.7332E-01 |
| 107 | 48.98 | 131.02 | 82.03 | 3.1504E+07 | 7.7347E-01 |
| 108 | 49.12 | 130.88 | 81.76 | 3.1417E+07 | 7.7362E-01 |
| 109 | 49.26 | 130.74 | 81.48 | 3.1330E+07 | 7.7376E-01 |
| 110 | 49.39 | 130.61 | 81.21 | 3.1243E+07 | 7.7391E-01 |
| 111 | 49.53 | 130.47 | 80.94 | 3.1156E+07 | 7.7406E-01 |
| 112 | 49.67 | 130.33 | 80.67 | 3.1069E+07 | 7.7421E-01 |
| 113 | 49.80 | 130.20 | 80.39 | 3.0982E+07 | 7.7436E-01 |
| 114 | 49.94 | 130.06 | 80.12 | 3.0896E+07 | 7.7451E-01 |
| 115 | 50.07 | 129.93 | 79.85 | 3.0809E+07 | 7.7466E-01 |
| 116 | 50.21 | 129.79 | 79.58 | 3.0722E+07 | 7.7481E-01 |
| 117 | 50.34 | 129.66 | 79.31 | 3.0635E+07 | 7.7496E-01 |
| 118 | 50.48 | 129.52 | 79.04 | 3.0548E+07 | 7.7511E-01 |
| 119 | 50.61 | 129.39 | 78.78 | 3.0461E+07 | 7.7525E-01 |
| 120 | 50.75 | 129.25 | 78.51 | 3.0375E+07 | 7.7540E-01 |
| 121 | 50.88 | 129.12 | 78.24 | 3.0288E+07 | 7.7555E-01 |
| 122 | 51.01 | 128.99 | 77.97 | 3.0201E+07 | 7.8434E-01 |
| 123 | 51.15 | 128.85 | 77.71 | 3.0114E+07 | 7.8449E-01 |
| 124 | 51.28 | 128.72 | 77.44 | 3.0027E+07 | 7.8464E-01 |
| 125 | 51.41 | 128.59 | 77.18 | 2.9940E+07 | 7.8478E-01 |
| 126 | 51.54 | 128.46 | 76.91 | 2.9854E+07 | 7.8493E-01 |
| 127 | 51.68 | 128.32 | 76.65 | 2.9767E+07 | 7.8508E-01 |
| 128 | 51.81 | 128.19 | 76.38 | 2.9680E+07 | 7.8523E-01 |
| 129 | 51.94 | 128.06 | 76.12 | 2.9593E+07 | 7.8538E-01 |
| 130 | 52.07 | 127.93 | 75.86 | 2.9506E+07 | 7.8553E-01 |
| 131 | 52.20 | 127.80 | 75.59 | 2.9419E+07 | 7.8568E-01 |
| 132 | 52.33 | 127.67 | 75.33 | 2.9332E+07 | 7.8583E-01 |
| 133 | 52.47 | 127.53 | 75.07 | 2.9246E+07 | 7.8598E-01 |
| 134 | 52.60 | 127.40 | 74.81 | 2.9159E+07 | 7.8612E-01 |
| 135 | 52.73 | 127.27 | 74.55 | 2.9072E+07 | 7.8627E-01 |
| 136 | 52.86 | 127.14 | 74.29 | 2.8985E+07 | 7.8642E-01 |
| 137 | 52.99 | 127.01 | 74.03 | 2.8898E+07 | 7.8657E-01 |
| 138 | 53.12 | 126.88 | 73.77 | 2.8811E+07 | 7.8672E-01 |
| 139 | 53.25 | 126.75 | 73.51 | 2.8725E+07 | 7.8687E-01 |
| 140 | 53.37 | 126.63 | 73.25 | 2.8638E+07 | 7.8702E-01 |
| 141 | 53.50 | 126.50 | 72.99 | 2.8551E+07 | 7.8717E-01 |
| 142 | 53.63 | 126.37 | 72.73 | 2.8464E+07 | 7.8732E-01 |
| 143 | 53.76 | 126.24 | 72.48 | 2.8377E+07 | 7.8747E-01 |
| 144 | 53.89 | 126.11 | 72.22 | 2.8290E+07 | 7.8761E-01 |
| 145 | 54.02 | 125.98 | 71.96 | 2.8204E+07 | 7.8776E-01 |
| 146 | 54.15 | 125.85 | 71.71 | 2.8117E+07 | 7.8791E-01 |
| 147 | 54.27 | 125.73 | 71.45 | 2.8030E+07 | 7.8806E-01 |
| 148 | 54.40 | 125.60 | 71.20 | 2.7943E+07 | 7.8821E-01 |
| 149 | 54.53 | 125.47 | 70.94 | 2.7856E+07 | 7.8836E-01 |
| 150 | 54.66 | 125.34 | 70.69 | 2.7769E+07 | 7.8851E-01 |
| 151 | 54.78 | 125.22 | 70.43 | 2.7682E+07 | 7.8866E-01 |
| 152 | 54.91 | 125.09 | 70.18 | 2.7596E+07 | 7.8881E-01 |
| 153 | 55.04 | 124.96 | 69.93 | 2.7509E+07 | 7.8895E-01 |
| 154 | 55.16 | 124.84 | 69.67 | 2.7422E+07 | 7.8910E-01 |
| 155 | 55.29 | 124.71 | 69.42 | 2.7335E+07 | 7.8925E-01 |
| 156 | 55.41 | 124.59 | 69.17 | 2.7248E+07 | 7.8940E-01 |
| 157 | 55.54 | 124.46 | 68.92 | 2.7161E+07 | 7.8955E-01 |
| 158 | 55.67 | 124.33 | 68.67 | 2.7075E+07 | 7.8970E-01 |
| 159 | 55.79 | 124.21 | 68.42 | 2.6988E+07 | 7.8985E-01 |
| 160 | 55.92 | 124.08 | 68.17 | 2.6901E+07 | 7.9000E-01 |
| 161 | 56.04 | 123.96 | 67.92 | 2.6814E+07 | 7.9015E-01 |
| 162 | 56.17 | 123.83 | 67.67 | 2.6727E+07 | 7.9029E-01 |
| 163 | 56.29 | 123.71 | 67.42 | 2.6640E+07 | 7.9044E-01 |
| 164 | 56.42 | 123.58 | 67.17 | 2.6554E+07 | 7.9059E-01 |
| 165 | 56.54 | 123.46 | 66.92 | 2.6467E+07 | 7.9074E-01 |
| 166 | 56.66 | 123.34 | 66.67 | 2.6380E+07 | 7.9089E-01 |
| 167 | 56.79 | 123.21 | 66.42 | 2.6293E+07 | 7.9104E-01 |
| 168 | 56.91 | 123.09 | 66.18 | 2.6206E+07 | 7.9119E-01 |
| 169 | 57.04 | 122.96 | 65.93 | 2.6119E+07 | 7.9134E-01 |
| 170 | 57.16 | 122.84 | 65.68 | 2.6032E+07 | 7.9149E-01 |
| 171 | 57.28 | 122.72 | 65.43 | 2.5946E+07 | 7.9163E-01 |
| 172 | 57.41 | 122.59 | 65.19 | 2.5859E+07 | 7.9178E-01 |
| 173 | 57.53 | 122.47 | 64.94 | 2.5772E+07 | 7.9193E-01 |
| 174 | 57.65 | 122.35 | 64.70 | 2.5685E+07 | 7.9208E-01 |

TABLE 1-continued

RECORDING PARAMETERS FOR A SKEW MIRROR EMBODIMENT

| Grating Number | $\theta_{R1}$ First Recording Beam Angle (degrees)* | $\theta_{R2}$ Second Recording Beam Angle (degrees)* | Interbeam Angle ($\alpha$) (degrees) | $|K_G|$ Grating Frequency (rad/m)** | Exposure Time (seconds) |
|---|---|---|---|---|---|
| 175 | 57.77 | 122.23 | 64.45 | 2.5598E+07 | 7.9223E−01 |
| 176 | 57.90 | 122.10 | 64.21 | 2.5511E+07 | 7.9238E−01 |
| 177 | 58.02 | 121.98 | 63.96 | 2.5425E+07 | 7.9253E−01 |
| 178 | 58.14 | 121.86 | 63.72 | 2.5338E+07 | 7.9268E−01 |
| 179 | 58.26 | 121.74 | 63.47 | 2.5251E+07 | 7.9283E−01 |
| 180 | 58.38 | 121.62 | 63.23 | 2.5164E+07 | 7.9297E−01 |
| 181 | 58.51 | 121.49 | 62.99 | 2.5077E+07 | 7.9312E−01 |
| 182 | 58.63 | 121.37 | 62.74 | 2.4990E+07 | 7.9327E−01 |
| 183 | 58.75 | 121.25 | 62.50 | 2.4904E+07 | 7.9342E−01 |
| 184 | 58.87 | 121.13 | 62.26 | 2.4817E+07 | 7.9357E−01 |
| 185 | 58.99 | 121.01 | 62.02 | 2.4730E+07 | 7.9372E−01 |
| 186 | 59.11 | 120.89 | 61.78 | 2.4643E+07 | 7.9387E−01 |
| 187 | 59.23 | 120.77 | 61.53 | 2.4556E+07 | 7.9402E−01 |
| 188 | 59.35 | 120.65 | 61.29 | 2.4469E+07 | 7.9417E−01 |
| 189 | 59.47 | 120.53 | 61.05 | 2.4382E+07 | 7.9432E−01 |
| 190 | 59.59 | 120.41 | 60.81 | 2.4296E+07 | 7.9446E−01 |
| 191 | 59.71 | 120.29 | 60.57 | 2.4209E+07 | 7.9461E−01 |
| 192 | 59.83 | 120.17 | 60.33 | 2.4122E+07 | 7.9476E−01 |
| 193 | 59.95 | 120.05 | 60.09 | 2.4035E+07 | 7.9491E−01 |
| 194 | 60.07 | 119.93 | 59.85 | 2.3948E+07 | 7.9506E−01 |
| 195 | 60.19 | 119.81 | 59.61 | 2.3861E+07 | 7.9521E−01 |
| 196 | 60.31 | 119.69 | 59.37 | 2.3775E+07 | 7.9536E−01 |
| 197 | 60.43 | 119.57 | 59.14 | 2.3688E+07 | 7.9551E−01 |
| 198 | 60.55 | 119.45 | 58.90 | 2.3601E+07 | 7.9566E−01 |
| 199 | 60.67 | 119.33 | 58.66 | 2.3514E+07 | 7.9580E−01 |
| 200 | 60.79 | 119.21 | 58.42 | 2.3427E+07 | 7.9595E−01 |
| 201 | 60.91 | 119.09 | 58.19 | 2.3340E+07 | 7.9610E−01 |
| 202 | 61.03 | 118.97 | 57.95 | 2.3254E+07 | 7.9625E−01 |
| 203 | 61.14 | 118.86 | 57.71 | 2.3167E+07 | 7.9640E−01 |
| 204 | 61.26 | 118.74 | 57.47 | 2.3080E+07 | 7.9655E−01 |
| 205 | 61.38 | 118.62 | 57.24 | 2.2993E+07 | 7.9670E−01 |
| 206 | 61.50 | 118.50 | 57.00 | 2.2906E+07 | 7.9685E−01 |
| 207 | 61.62 | 118.38 | 56.77 | 2.2819E+07 | 7.9700E−01 |
| 208 | 61.73 | 118.27 | 56.53 | 2.2732E+07 | 7.9714E−01 |
| 209 | 61.85 | 118.15 | 56.30 | 2.2646E+07 | 7.9729E−01 |
| 210 | 61.97 | 118.03 | 56.06 | 2.2559E+07 | 7.9744E−01 |
| 211 | 62.09 | 117.91 | 55.83 | 2.2472E+07 | 7.9759E−01 |
| 212 | 62.20 | 117.80 | 55.59 | 2.2385E+07 | 7.9774E−01 |
| 213 | 62.32 | 117.68 | 55.36 | 2.2298E+07 | 7.9789E−01 |
| 214 | 62.44 | 117.56 | 55.12 | 2.2211E+07 | 7.9804E−01 |
| 215 | 62.56 | 117.44 | 54.89 | 2.2125E+07 | 7.9819E−01 |
| 216 | 62.67 | 117.33 | 54.66 | 2.2038E+07 | 7.9834E−01 |
| 217 | 62.79 | 117.21 | 54.42 | 2.1951E+07 | 7.9848E−01 |
| 218 | 62.91 | 117.09 | 54.19 | 2.1864E+07 | 7.9863E−01 |
| 219 | 63.02 | 116.98 | 53.96 | 2.1777E+07 | 7.9878E−01 |
| 220 | 63.14 | 116.86 | 53.72 | 2.1690E+07 | 7.9893E−01 |
| 221 | 63.25 | 116.75 | 53.49 | 2.1604E+07 | 7.9908E−01 |
| 222 | 63.37 | 116.63 | 53.26 | 2.1517E+07 | 7.9923E−01 |
| 223 | 63.49 | 116.51 | 53.03 | 2.1430E+07 | 7.9938E−01 |
| 224 | 63.60 | 116.40 | 52.80 | 2.1343E+07 | 7.9953E−01 |
| 225 | 63.72 | 116.28 | 52.57 | 2.1256E+07 | 7.9968E−01 |
| 226 | 63.83 | 116.17 | 52.33 | 2.1169E+07 | 7.9983E−01 |
| 227 | 63.95 | 116.05 | 52.10 | 2.1082E+07 | 7.9997E−01 |
| 228 | 64.06 | 115.94 | 51.87 | 2.0996E+07 | 8.0012E−01 |

Figure 13:
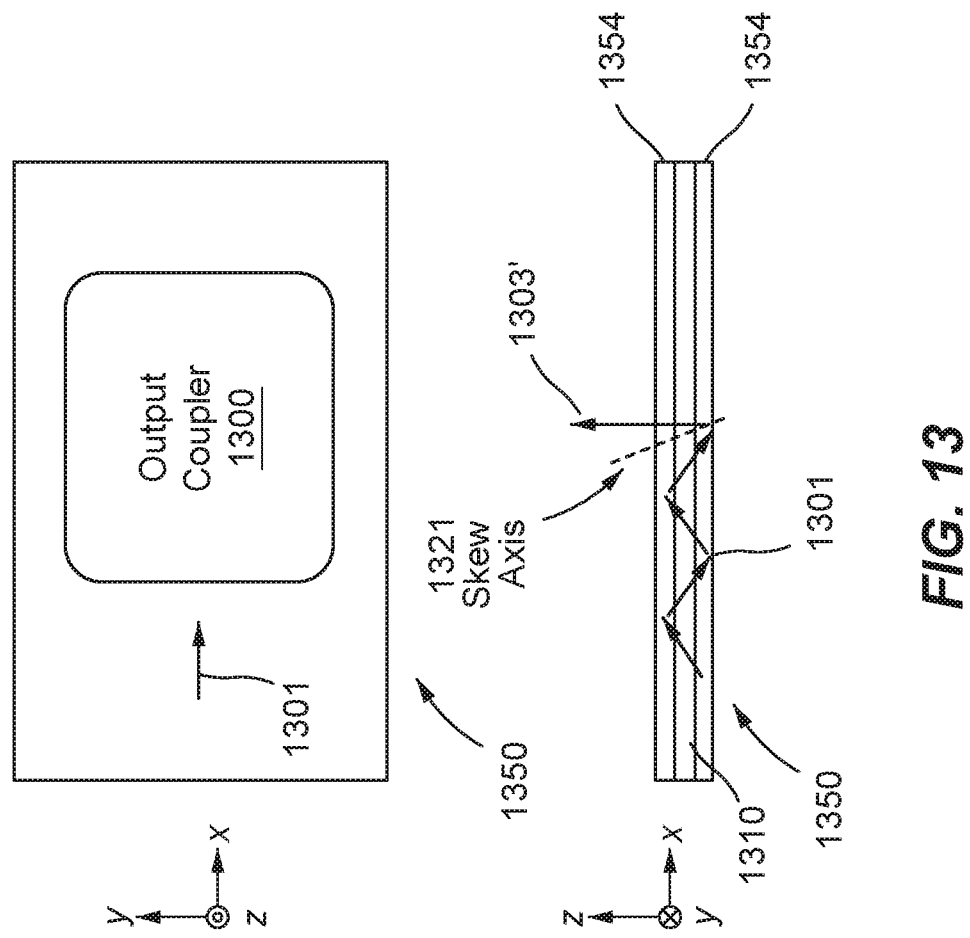
FIG. 13 illustrates an experimentally realized holographic skew output coupler with a 53.4° horizontal field of view and a 31.6° vertical field of view coupled to a waveguide.

*beam angles are relative to the skew axis, which is oriented −30.25° relative to surface normal
**gratings have grating vector angles oriented −30.25° relative to surface normal Experimental Demonstration FIG. 13 shows a slab waveguide 1350 with a holographic skew mirror output coupler 1300 (e.g., like the output coupler 1000 shown in FIG. 10) that was fabricated according to the parameters shown in Table 1. The holographic skew output coupler 1300 had a 53.4° horizontal field-of-view and a 31.6° vertical (Bragg degenerate) field-of-view. The skew mirror output coupler was programmed into the recording media according to the parameters of Table 1. An optically flat waveguide package was fabricated using two 1"×2" 500 μm thick Eagle $x_G$ glass substrates 1354 with a 500 μm recording layer 1310 of Akonia formulation AK291 photopolymer medium. These substrates transmit about 90% of incident visible light in both directions. A TIGER prism skew recorder delivered collimated signal and reference beams approximately 40 mm in diameter at an optical power of approximately 2 mW/cm² for each beam. Each beam was apodized by a rectangular aperture measuring 25×21 mm (width by height).

The resulting waveguide 1350 and output coupler 1300 were tested to verify their properties. A coupling prism was affixed to left (x<0) end of the waveguide 1350 using an optical adhesive, and an image 1301 was projected into the waveguide through the coupling prism using an off-the-shelf picoprojector. This image was guided within the recording layer via total internal reflection at the substrate boundaries to the gratings within the output coupler 1300. These gratings reflect the image out of the coupler 1300 (e.g., towards an eye) about an axis of reflection forming an angle of about −30.25 degrees with respect to the surface normal. The output image 1303' was visually inspected to approximately confirm the 53.4° horizontal field-of-view (the picoprojector had only a ~30° field of view, so it was manually rotated to examine both ends of the waveguide range).

Figure 14:
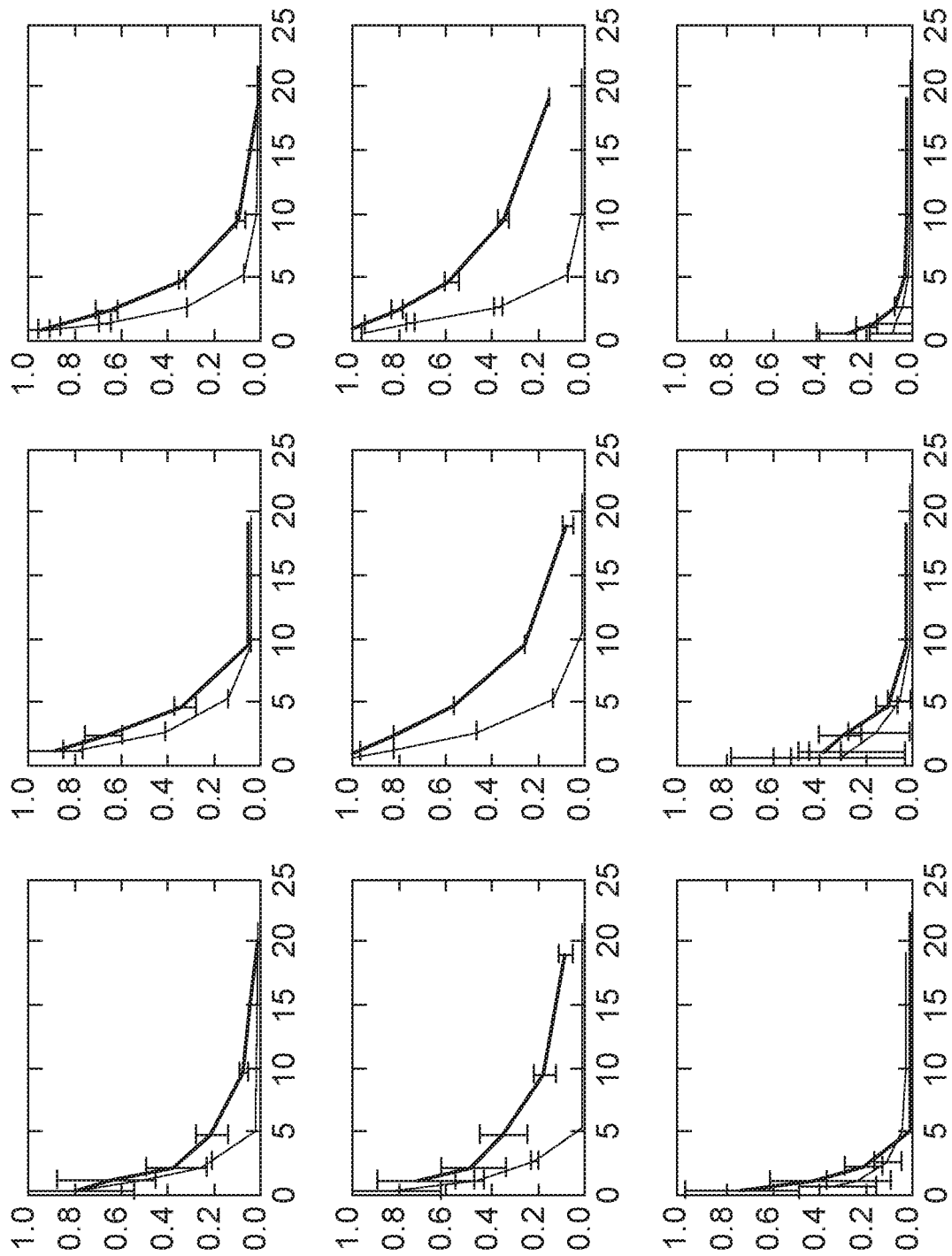
FIG. 14 is a mosaic of modulation transfer function (MTF) plots of the holographic skew mirror of FIG. 13.

A modulation transfer function (MTF) test was performed across the field of view to verify projected image quality. FIG. 14 depicts a mosaic of nine plots of the MTF measured across the field of view, where the position of the plot within the figure corresponds to the position in the field of view (i.e., the top left plot corresponds to the top left of the field, the center corresponds to the center, etc.). The horizontal axis of each plot in FIG. 14 is spatial frequency (cycles/degree) and the vertical axis is contrast ratio (CR). The darker lines correspond to vertical MTF and lighter lines to horizontal MTF. A large portion of the degradation is due to the projector lens, demonstrated by the low CR of the vertical MTF, which is not deleteriously effected by the output coupler.

Skew Mirror-Based Head-Mounted Display

Figure 15:
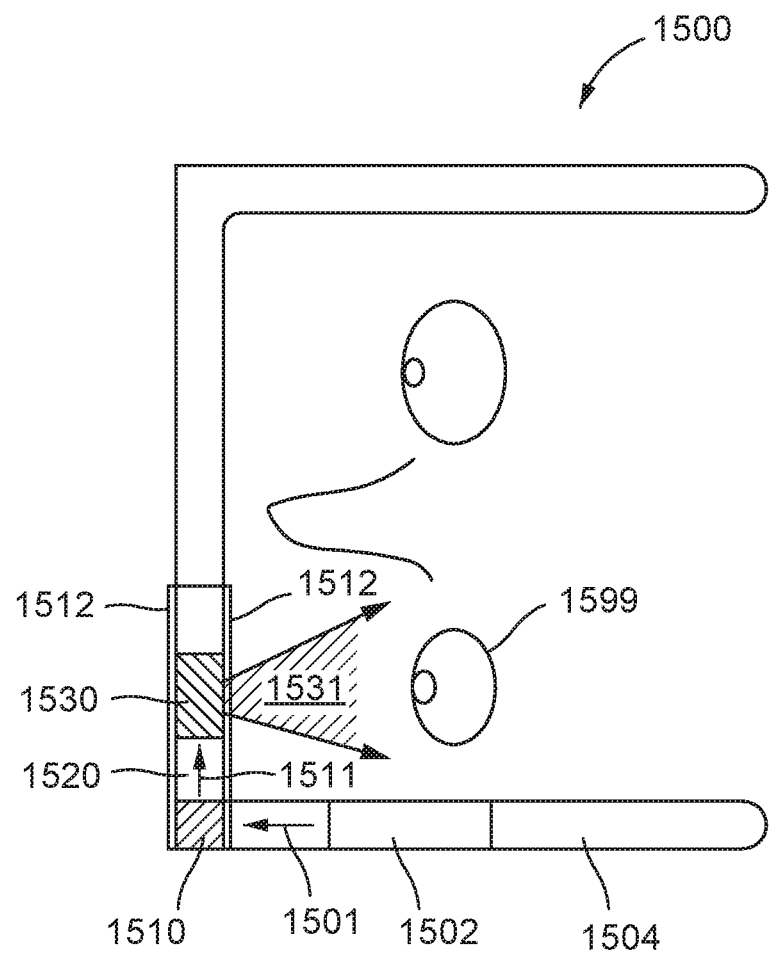
FIG. 15 shows a head-mounted display with a wide field-of-view holographic skew mirror.

FIG. 15 shows a head-mounted display 1500 with wide field of view skew mirror-based couplers for projecting images to an eye 1599 of a viewer. An image source 1502, such as a microdisplay illuminated by one or more lasers or light-emitting diodes (LEDs), disposed in or along an eyewear temple 1504 emits image light 1501 at one or more colors (e.g., red, green, and blue light) in a direction substantially parallel to the eyewear temple 1504. A skew input coupler 1510, which comprises a grating structure recorded in a grating medium sandwiched between a pair of transparent substrates 1512, couples the light into a slab waveguide 1520. (A prism or edge coupling can also be used to couple the light 1501 from the image source 1502 into the slab waveguide 1520.) The slab waveguide 1520 guides this light 1511 to a skew output coupler 1530 like the one shown in FIG. 10.

This skew output coupler 1530 comprises another grating structure recorded in more grating medium sandwiched between the transparent substrates 1512. The skew output coupler 1530 couples this light 1531 out towards to the viewer over a wide field of view, e.g., a field of view spanning about 50 degrees horizontally and about 30 degrees vertically as perceived by the viewer. This causes the viewer to perceive an image with a wide field of view. As shown in FIG. 15, the skew input coupler 1510 has a skew angle of about +30.25 degrees and the skew output coupler 1530 has a skew angle of about −30.25 degrees (e.g., like, the skew input/output coupler shown in FIG. 10).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electronic device comprising:
a layer of medium; and
diffractive gratings in the layer of medium, wherein:
the diffractive gratings are configured to reflect incident light as reflected light, the incident light and the reflected light form an angle bisected by a reflective axis;
the reflective axis varies by less than 1 degree where the incident light is incident upon the layer of medium at a range of internal angles of incidence spanning at least 15 degrees; and
the reflective axis is offset from a surface normal of the layer of medium.

2. The electronic device of claim 1 wherein the range of internal angles of incidence spans at least 30 degrees.

3. The electronic device of claim 1 wherein the diffractive gratings include one or more holograms having a grating frequency ($|K_G|$) spanning a range of at least $2.00 \times 10^5$ radians per meter.

4. The electronic device of claim 1 wherein:
the incident light has a first wavelength and a second wavelength,
the reflected light has the first wavelength and the second wavelength, and
the second wavelength differs from the first wavelength by at least 50 nm.

5. The electronic device of claim 4, wherein:
the incident light has a third wavelength,
the reflected light has the third wavelength, and
the third wavelength differs from each of the first wavelength and the second wavelength by at least 50 nm.

6. The electronic device of claim 5 wherein the first wavelength comprises a red wavelength, the second wavelength comprises a green wavelength, and the third wavelength comprises a blue wavelength.

7. The electronic device of claim 1 wherein the diffractive gratings include one or more holograms having a grating frequency ($|K_G|$) spanning a range of at least $1.68 \times 10^6$ radians per meter.

8. The electronic device of claim 1 wherein the diffractive gratings include one or more holograms having a grating frequency ($|K_G|$) spanning a range of at least $5.0 \times 10^3$ radians per meter.

9. The electronic device of any of claim 1 wherein the diffractive gratings include one or more holograms having a grating frequency ($|K_G|$) spanning a range of at least $1.24 \times 10^7$ radians per meter.

10. The electronic device of claim 1 wherein the reflective axis is offset from the surface normal of the layer of medium by at least 2.0 degrees.

11. The electronic device of claim 1 wherein the diffractive gratings comprise at least nine holograms.

12. The electronic device of claim 11 wherein a mean adjacent grating frequency $|\Delta K_G|$ of the at least nine holograms is in a range between $5.0 \times 10^3$ rad/m and $1.0 \times 10^7$ rad/m.

13. The electronic device of claim 1 wherein:
the incident light is incident upon the diffractive gratings from inside the optical system, and
the reflected light exits the optical system.

14. The electronic device of claim 1 further comprising at least one substrate on the layer of medium.

15. The electronic device of claim 14 wherein the at least one substrate includes first and second substrates and the layer of medium is disposed between the first and second substrates.

16. The electronic device of claim 15 wherein the layer of medium comprises a photopolymer medium at least 100 μm thick and the first and second substrates transmit at least 60% of the incident light of the wavelength and at least 60% of the reflected light of the wavelength.

17. The electronic device of claim 15 wherein the layer of medium has a first index of refraction and the first and second substrates have a second index of refraction within 0.1 of the first index of refraction.

18. A method comprising:
illuminating diffractive gratings in a medium with incident light, the incident light reflecting off the diffractive gratings as reflected light,
wherein the incident light and the reflected light form an angle bisected by a reflective axis tilted with respect to a surface normal of the medium, and
the reflective axis varies by less than 1 degree where the incident light is incident upon the diffractive gratings at a range of internal angles of incidence spanning at least 15 degrees.

19. The method of claim 18, wherein the reflective axis varies by less than 1 degree where the incident light is incident upon the medium at a range of internal angles of incidence spanning at least 30 degrees.

20. The method of claim 18, wherein illuminating the diffractive gratings comprises:
coupling the incident light into the medium; and
totally internally reflecting the incident light within the medium.

21. The method of claim 18, wherein illuminating the diffractive gratings comprises:
guiding the incident light at least partway to the diffractive gratings via the medium.

22. The method of claim 18 wherein the incident light and the reflected light each comprise first and second wavelengths that differ by at least 50 nm.

23. The method of claim 22 wherein the incident light and the reflected light each comprise a third wavelength that differs from each of the first wavelength and the second wavelength by at least 50 nm.

24. The method of claim 18, further comprising:
coupling the reflected light out of the medium at an angle of at least 25 degrees with respect to the surface normal of the medium.

25. A display comprising:
a medium; and
gratings in the medium and configured to reflect incident light as reflected light, wherein:
the incident light and the reflected light are separated by an angle that is bisected by a reflective axis, and
the reflective axis varies by less than 1 degree where the incident light is incident upon the medium at a range of internal angles of incidence spanning at least 15 degrees.

26. The display of claim 25 wherein the reflective axis is oriented at a non-zero angle with respect to a surface normal of the medium.

27. The display of claim 25, wherein the display system is integrated into a head-mounted device.

28. The display of claim 25, wherein the gratings comprise a plurality of volume holograms.

29. The display of claim 28, wherein the plurality of volume holograms comprises at least nine holograms.

30. The display of claim 28, wherein the plurality of volume holograms are at least partially overlapping in the medium.

31. The display of claim 25, wherein the reflective axis varies by less than 1 degree where the incident light is incident upon the medium at a range of internal angles of incidence spanning at least 30 degrees.

32. The display of claim 25, wherein the gratings include one or more holograms having a grating frequency ($|K_G|$) spanning a range of at least $2.00 \times 10_5$ radians per meter.

33. The display of claim 25, wherein the gratings include one or more holograms having a grating frequency ($|K_G|$) spanning a range of at least $5.01 \times 10_6$ radians per meter.

34. The display of claim 25, wherein the gratings include one or more holograms having a grating frequency ($|K_G|$) spanning a range of at least $1.24 \times 10_7$ radians per meter.

35. The display of claim 25, wherein the gratings include one or more holograms having grating frequencies ($|K_G|$) spanning a range of greater than $5.10 \times 10_5$ radians per meter and less than $3.15 \times 10_7$ radians per meter.

36. The display of claim 25, further comprising at least one substrate adjacent to the medium.

37. An electronic device comprising:
a medium; and
at least nine holograms overlapping within a given volume of the medium, the at least nine holograms being configured to reflect incident light about one or more reflective axes offset from a surface normal of the medium, wherein the at least nine holograms have grating frequencies ($|K_G|$) spanning a range of at least $5.0 \times 10_3$ radians per meter.

38. The electronic device of claim 37, wherein the one or more reflective axes vary by less than 1 degree where the incident light is incident upon the grating medium at a range of internal angles of incidence spanning at least 15 degrees.

* * * * *